(12) United States Patent
Zhadanovsky

(10) Patent No.: US 8,702,013 B2
(45) Date of Patent: Apr. 22, 2014

(54) VAPOR VACUUM HEATING SYSTEMS AND INTEGRATION WITH CONDENSING VACUUM BOILERS

(71) Applicant: Igor Zhadanovsky, West Newton, MA (US)

(72) Inventor: Igor Zhadanovsky, West Newton, MA (US)

( * ) Notice: Subject to any disclaimer, the term of this patent is extended or adjusted under 35 U.S.C. 154(b) by 0 days.

(21) Appl. No.: 14/025,292

(22) Filed: Sep. 12, 2013

(65) Prior Publication Data

US 2014/0034743 A1    Feb. 6, 2014

Related U.S. Application Data

(63) Continuation-in-part of application No. 12/984,468, filed on Jan. 4, 2011.

(60) Provisional application No. 61/702,533, filed on Sep. 18, 2012, provisional application No. 61/338,341, filed on Feb. 18, 2010.

(51) Int. Cl.
*F24D 1/08* (2006.01)
*F24D 1/02* (2006.01)
*F24D 1/00* (2006.01)

(52) U.S. Cl.
USPC .................. 237/74; 237/73; 237/67; 237/16; 237/7; 237/9 R; 432/91

(58) Field of Classification Search
CPC ............... F24D 1/08; F24D 1/02; F24D 1/00; F24D 19/0004; F24D 19/0009
USPC ................. 237/74, 73, 67, 16, 17, 18, 7, 9 R; 432/91
See application file for complete search history.

(56) References Cited

U.S. PATENT DOCUMENTS

| 318,401 | A | * | 5/1885 | Tudor | 237/9 R |
| 552,753 | A | * | 1/1896 | Febiger, Jr. | 237/67 |

(Continued)

FOREIGN PATENT DOCUMENTS

| JP | 60186626 A | * | 9/1985 | F24D 1/00 |
| JP | 60200030 A | * | 10/1985 | F24D 1/02 |

(Continued)

OTHER PUBLICATIONS

"Trane Vapor System," Everything2.com, Retrieved Oct. 23, 2013, Available at: http://everything2.com/title/Trane+Vapor+System.

(Continued)

*Primary Examiner* — Kang Hu
*Assistant Examiner* — Daniel E Namay
(74) *Attorney, Agent, or Firm* — American Patent Agency PC; Daniar Hussain; Karl Dresdner

(57) ABSTRACT

In order to solve the numerous problems with existing steam, vacuum, and hot water heating systems, first presented is a novel system and method for a vapor vacuum system having low temperature condensate return which can operate without steam traps in both single-pipe and dual-pipe configurations. Secondly is disclosed systems and methods for integrating the disclosed vapor vacuum system with a condensing boiler. Thirdly is presented several systems and method of operating radiators having low temperature condensate return with the disclosed vapor vacuum system. Finally is presented condensing vacuum boiler designs that can be utilized with the disclosed vapor vacuum system. Also presented are embodiments having naturally-induced vacuum and utilizing district heat as well as combined heat and power. All innovations presented herein make vapor vacuum steam more efficient and economical for industrial, commercial, and home applications.

31 Claims, 14 Drawing Sheets

(56) References Cited

U.S. PATENT DOCUMENTS

| | | | |
|---|---|---|---|
| 557,530 A * | 3/1896 | Field | 237/67 |
| 604,335 A * | 5/1898 | Paul | 237/9 R |
| 847,934 A * | 3/1907 | Gifford | 237/67 |
| 863,212 A * | 8/1907 | Paul | 137/174 |
| 874,112 A * | 12/1907 | Peck | 237/9 R |
| 962,550 A * | 6/1910 | Collis | 237/9 R |
| 1,005,160 A * | 10/1911 | Cole | 237/67 |
| 1,093,722 A * | 4/1914 | Osbourn | 237/9 R |
| 1,122,781 A * | 12/1914 | McAlear | 237/12.1 |
| 1,148,075 A * | 7/1915 | Budge | 417/107 |
| 1,189,806 A * | 7/1916 | Gibson | 237/8 C |
| 1,326,944 A * | 1/1920 | MacDonald | 237/68 |
| 1,345,149 A * | 6/1920 | Edsen | 237/61 |
| 1,404,995 A * | 1/1922 | Mouat | 137/197 |
| 1,542,100 A * | 6/1925 | Rose | 237/67 |
| 1,544,338 A * | 6/1925 | Nygren | 237/67 |
| 1,696,028 A * | 12/1928 | Carroll | 122/449 |
| 1,783,428 A * | 12/1930 | Jennings | 417/19 |
| 1,802,384 A * | 4/1931 | Jarvis | 237/67 |
| 1,830,051 A * | 11/1931 | Carroll | 237/9 R |
| 1,845,023 A * | 2/1932 | Jennings | 237/67 |
| 1,945,641 A * | 2/1934 | Jennings | 237/67 |
| 1,946,676 A * | 2/1934 | Eaton | 237/67 |
| 1,951,588 A * | 3/1934 | Van Zandt | 237/67 |
| 1,968,834 A | 8/1934 | Jones | |
| 1,986,391 A * | 1/1935 | Crosthwait, Jr. | 237/67 |
| 1,998,282 A * | 4/1935 | Luth | 137/489 |
| 2,004,226 A | 6/1935 | Stickle | |
| 2,060,844 A * | 11/1936 | Adlam | 237/9 R |
| 2,083,068 A * | 6/1937 | Jennings | 237/9 R |
| 2,102,197 A * | 12/1937 | Crosthwait, Jr. | 237/67 |
| 2,103,178 A * | 12/1937 | Raymond | 237/9 R |
| 2,131,555 A * | 9/1938 | Dunham et al. | 237/9 B |
| 2,131,901 A * | 10/1938 | Parkton | 237/67 |
| 2,176,001 A * | 10/1939 | Jennings | 236/91 R |
| 2,176,002 A * | 10/1939 | Jennings | 236/91 R |
| 2,186,680 A * | 1/1940 | Lavergne | 237/9 R |
| 2,236,350 A * | 3/1941 | Hoyt | 237/67 |
| 2,306,988 A * | 12/1942 | Adams | 137/395 |
| RE22,752 E * | 5/1946 | Ferguson | 237/9 R |
| 2,534,826 A * | 12/1950 | McKinnon | 237/9 R |
| 2,868,461 A * | 1/1959 | Gaddis | 237/9 R |
| 2,886,247 A * | 5/1959 | Arbogast | 237/9 R |
| 2,898,049 A * | 8/1959 | Parkton | 237/9 R |
| RE26,987 E * | 11/1970 | Gatza | 237/67 |
| 3,595,476 A * | 7/1971 | Eaton | 237/8 R |
| 4,090,557 A | 5/1978 | Currier | |
| 4,398,663 A * | 8/1983 | Hegberg | 237/9 R |
| 4,480,785 A * | 11/1984 | Balz | 237/6 |
| 2008/0173723 A1* | 7/2008 | Zhadanovsky | 237/67 |
| 2010/0045470 A1* | 2/2010 | Araiza et al. | 340/603 |
| 2011/0198406 A1 | 8/2011 | Zhadanovsky | |

FOREIGN PATENT DOCUMENTS

| | | | | |
|---|---|---|---|---|
| JP | 62119330 A * | 5/1987 | | F24D 1/08 |
| JP | 63032223 A * | 2/1988 | | F24D 1/08 |
| WO | WO2012093310 A2 | 7/2012 | | |

OTHER PUBLICATIONS

"TLV Vacuumizer: Vacuum steam heating and cooling system," TLV International, Inc. corporate brochure, Retrieved Oct. 23, 2013, Available at: http://www.tlv.com/global_pdf/tii/e-pamphlet-04-hp.pdf.

Holohan, Dan, "The Lost Art of Steam Heating," pp. 242-253, 259-267, Dan Holohan Associates, Beth Page, NC, 2002. (ISBN 0-9743960-9-5).

Freeman, Rob, Jr., "ITC Steam Temperature Control System," Johnson Controls Inc., Nov. 8, 2009, Available at: http://www.green-buildings.com/content/781087-itc-steam-temperature-control-system.

Zhadanovsky, Igor, "Vapor Heating System with Naturally Induced Vacuum (VHSNIV)," IDEA Conference, Indianapolis, IN, Jun. 13-16, 2010.

Zhadanovsky, Igor, "Steam Heating System Upgrade to Vapor Heating System with Naturally Induced Vacuum (VHSNIV)," ASHRAE Transactions, vol. 117, Part 2, Montreal, QC, Jul. 1, 2011.

Zhadanovsky, Igor, "Vapor Vacuum Heating Technology," CIBSE ASHRAE Technical Symposium, Imperial College, London, UK, Apr. 18-19, 2012.

Zhadanovsky, Igor, "Scrutinizing Condensing Boilers With the Second Law of Thermodynamics (SLT)," Blog posted May 29, 2013, Retrieved Oct. 23, 2013, Available at: http://homeenergypros.lbl.gov/profiles/blogs/scrutinizing-condensing-boilers-with-the-second-law-of.

* cited by examiner

US 8,702,013 B2

VAPOR VACUUM HEATING SYSTEMS AND INTEGRATION WITH CONDENSING VACUUM BOILERS

REFERENCE TO RELATED APPLICATIONS

This application is a non-provisional and claims the benefit of U.S. Ser. No. 61/702,533, filed on Sep. 18, 2012, entitled "Condensing boiler and vapor vacuum heating system combo," the entirety of which is hereby incorporated by reference herein. This application is a Continuation-In-Part of U.S. Ser. No. 12/984,468, filed on Jan. 4, 2011, and entitled "Vapor/vacuum heating system," which itself is a non-provisional of and claims the benefit of U.S. Ser. No. 61/338,341, filed on Feb. 18, 2010, and entitled "Vapor heating system with naturally induced vacuum," the entirety of both of which are hereby incorporated by reference herein.

FIELD OF THE INVENTION

The present invention relates to systems and methods for heating a space using a vapor vacuum-based heating system having numerous improvements over traditional vacuum systems. The present invention also relates to increasing the efficiency of condensing boilers and allowing condensing boilers to be utilized with vapor vacuum heating systems.

BACKGROUND OF THE INVENTION

The statements in this section merely provide background information related to the present disclosure and may not constitute prior art.

Existing positive low-pressure steam heating systems provide simple and reliable techniques for heating in a wide variety of industrial, commercial, and residential applications. Water (as a liquid) heated in a boiler becomes steam (a gas), which then rises through the feeder pipes (conduits) and condenses in radiators, giving off its latent heat. Radiators become hot and heat up objects in the room directly as well as the surrounding air. Steam is traditionally delivered under a low pressure of up to 2 psig at 218° F. in order to improve boiler safety and efficiency. Additionally, steam at lower pressure moves faster, contains less water, and doesn't create boiler low water problems. The boiler creates the initial steam pressure to overcome friction in the feeder pipes.

An existing steam system can be converted to a vapor (steam) vacuum system by operating the steam system under 5-10 inches of Hg vacuum. Although there are some efficiency gains, the conversion of a steam system into a vacuum system results in an increased maintenance cost due to additional vacuum equipment, condensate pumps, and electricity usage. In existing vacuum systems, steam traps are utilized in which condensate is separated from steam, sucked by a vacuum pump, and returned into the system by a water pump. Steam trap usage is also a major maintenance, repair, and replacement problem. Few new vacuum systems have been installed in the last fifty years due to high installation and maintenance costs.

Existing steam (vapor) systems are robust and reliable but have multiple problems, including high installation costs, noise, uneven heat distribution, and control difficulties. Therefore, many worn out steam systems are being retrofitted into hot water heating systems. However, such retrofits are very expensive because the boiler and the old plumbing have to be replaced which requires significant demolition of building internals. Alternatively, the level of building destruction is much less for conversion of a steam into a vacuum system and the existing boiler can be utilized. Therefore, a low-cost and efficient vacuum system would be an advantageous alternative for steam system retrofits as well as for new heating system installations.

In order to boost energy efficiency, modern hot water condensing boilers absorb the latent heat of water vapor from the flue gas. The recommended temperature of the water return (supply into boiler condensing section) is below 100° F. in order to condense most of the water from the flue gas. In reality, this temperature is at 140° F. or above for most of the heating season in order to deliver enough heat into the building. As a result, benefits of condensing mode usage are lost. Another problem of hot water condensing boilers is limited temperature of supply water. The typical temperature drop through a hot water heating system is 20° F., and therefore for condensing boilers, supply water temperature is limited to 120-160° F. At such low temperatures, the energy value of delivered heat is less than in a regular hot water system. This results in hot water condensing boilers that operate as traditional boilers with their condensing section inefficient for most of their operating time, eliminating the energy saving benefits of condensing boilers almost entirely while still having their high capital costs.

The temperature of condensate return in existing vacuum systems is either equal to the temperature of vapor rising through the same pipe or slightly lower in two pipe systems. The high temperature of condensate return is considered an inherent feature of the system and never challenged. Steam and vacuum systems are never used with condensing boilers, and therefore no steam or vacuum condensing boilers exist. Accordingly, as recognized by the present inventor, what are needed are a novel system and method for a vapor vacuum system having low temperature condensate return. What are also needed are a system and method for integrating a vapor vacuum system with a condensing boiler. As recognized by the present inventor, what is also needed is a vacuum condensing boiler that can be utilized with the vapor vacuum system.

Therefore, it would be an advancement in the state of the art to provide an apparatus, system, and method for a low temperature vapor system as well as ways to integrate such systems with condensing boilers. It would also be an advancement in the state of the art to provide a vacuum condensing boiler to work with such a system.

It is against this background that various embodiments of the present invention were developed.

BRIEF SUMMARY OF THE INVENTION

Accordingly, a preferred embodiment of the present invention is a heating system integrating a closed-loop two-pipe vapor vacuum distribution system having periodic condensate return and a vapor vacuum condensing boiler (shown in FIG. 6), the system comprising a vapor source adapted to generate vapor, the vapor source comprising an evaporating section and a condensing section; one or more radiators comprising a heat activated valve at an exit from each radiator, the valve set to close at approximately 100° F. to prevent hot condensate from entering into the condensing section; a feeder conduit connecting said vapor source to said radiators; a return conduit for returning condensate from each radiator back to said vapor source, wherein said return conduit contains no steam traps; a vacuum pump to evacuate air from the system to a vacuum level, wherein the vapor source, the feeder conduit, and the return conduit are air-tight; a temperature sensor adapted to sense a temperature of the vapor leaving the vapor source; a pressure sensor adapted to sense a pressure of the vapor source; and a control unit for controlling the condensing steam boiler and the vacuum pump based on the temperature and the pressure sensed by the temperature sensor and the pressure sensor to maintain a predetermined vacuum level and a predetermined temperature of the vapor, wherein the return conduit returns said condensate from the radiators to the condensing section at a temperature below approximately 100° F. sufficient for condensing water from flue gas from a burner in the vapor source.

Another embodiment of the present invention is the system described above, where air is evacuated by the vacuum pump when the vapor source is idle at a vapor source temperature below approximately 100° F. when the pressure measured in the pressure sensor is above a predetermined threshold.

Yet another embodiment of the present invention is the system described above, also including a thermostat in a space to be heated, wherein the vapor source is switched on and off by the control unit until a temperature in the space to be heated is equal to a thermostat set temperature.

Yet another embodiment of the present invention is the system described above, also including a backflow valve on a condensate return line at an entrance into the condensing section to prevent water backflow into the condensate return line.

Yet another embodiment of the present invention is the system described above, where the vacuum level in an idle system at a temperature in the vacuum condensing boiler below around 100° F. is up to 29 inches Hg.

Yet another embodiment of the present invention is the system described above, where the vacuum level and corresponding temperature of the vapor source is adjusted based on an outside temperature, and wherein a lower outside temperature results in a higher operating pressure and a corresponding higher temperature of the vapor source.

Yet another embodiment of the present invention is the system described above, where at least one radiator comprises a build-in heat activated valve adapted to close a radiator entrance when a condensate return temperature exceeds approximately 100° F.

Yet another embodiment of the present invention is the system described above, where the build-in heat activated valve comprises a capsule positioned at the radiator bottom and filled with a low boiling fluid (or wax), and said capsule is connected by a capillary to a bellow which expands and closes the radiator entrance when the capsule is heated above a set temperature.

Yet another embodiment of the present invention is the system described above, also including a set of valves on the vapor source adapted to split the system into a heated part, connected to the evaporating section, and a cooling part, connected to said condensing section, wherein a movement of the set of valves reconnects the cooling part to the evaporating section and the heated part to the condensing section, reversing system operation, without stopping boiler operation.

Yet another embodiment of the present invention is the system described above, where the feeder conduit from the vapor source to the radiators and the return conduit are made from thermoplastic tubing or noncorrosive copper.

Another embodiment of the present invention is a heating system having a closed-loop two-pipe vapor vacuum distribution system having periodic condensate return (shown in FIG. 3), the system comprising a vapor source adapted to generate vapor; one or more radiators, each radiator comprising a check valve on a radiator condensate return line adapted to periodically return condensate from the radiator, wherein at least one radiator entrance comprises a control valve adapted to control vapor flow into the radiator based on a temperature in the radiator's location; a feeder conduit connecting said vapor source to said radiators; a return conduit for returning condensate from each radiator back to said vapor source, wherein said return conduit contains no steam traps; a vacuum pump to evacuate air from the system, wherein the vapor source, the feeder conduit, and the return conduit are air-tight; a temperature sensor adapted to sense a temperature of the vapor leaving the vapor source; a pressure sensor adapted to sense a pressure of the vapor source; and a control unit for controlling the vapor source and the vacuum pump based on the temperature and the pressure sensed by the temperature sensor and the pressure sensor to maintain a predetermined vacuum level and a predetermined temperature of the vapor.

Yet another embodiment of the present invention is the system described above, where air is evacuated by the vacuum pump when the vapor source is idle when the pressure measured in the pressure sensor is above a predetermined threshold.

Yet another embodiment of the present invention is the system described above, also including a backflow valve on a condensate return line of the vapor source to prevent water backflow into the condensate return line.

Yet another embodiment of the present invention is the system described above, where the vacuum level in an idle system at a temperature in the vacuum condensing boiler below approximately 100° F. is up to 29 inches Hg. In some embodiments, the vacuum level is at least 20 inches Hg, and more preferably at least 25 inches Hg, and even more preferably at least 29 inches Hg.

Yet another embodiment of the present invention is the system described above, where the vacuum level and a corresponding temperature of the vapor source is adjusted based on an outside temperature, and wherein a lower outside temperature results in a higher operating pressure and corresponding higher temperature of the vapor source.

Another embodiment of the present invention is a heating system having a closed-loop two-pipe vapor vacuum distribution system (shown in FIG. 2), the system comprising a vapor source adapted to generate vapor; one or more radiators; a feeder conduit connecting said vapor source to said radiators; a return conduit for returning condensate from each radiator back to said vapor source, wherein said return conduit contains no steam traps; a vacuum pump to evacuate air from the idle cooled system to a vacuum level of at least 20 inches Hg, (more preferably at least 25 inches Hg, and most preferably at least 29 inches Hg), wherein the vapor source, the feeder conduit, and the return conduit are air-tight; a temperature sensor adapted to sense a temperature of the vapor leaving the vapor source; a pressure sensor adapted to sense a pressure at an exit of the vapor source; and a control unit for controlling the vapor source and the vacuum pump based on the temperature and the pressure sensed by the temperature sensor and the pressure sensor to maintain a consistent vacuum level and a consistent temperature of the vapor.

Yet another embodiment of the present invention is the system described above, where air is evacuated by the vacuum pump when the vapor source is idle when the pressure measured in the pressure sensor is above a predetermined threshold.

Yet another embodiment of the present invention is the system described above, also including a backflow valve on a condensate return line of the vapor source to prevent vapor from entering the condensate return line.

Yet another embodiment of the present invention is the system described above, where the vacuum level in an idle system at a temperature in the vacuum condensing boiler below approximately 100° F. is up to 29 inches Hg.

Yet another embodiment of the present invention is the system described above, where the vacuum level and a corresponding temperature of the vapor source is adjusted based on an outside temperature, and wherein a lower outside temperature results in a higher operating pressure and corresponding higher temperature of the vapor source.

Other embodiments of the present invention include methods corresponding to the systems described above, as well as methods of operation of the systems described above. Other features, utilities and advantages of the various embodiments of the invention will be apparent from the following more particular description of embodiments of the invention as illustrated in the accompanying drawings, in which like numerals indicate like elements.

DETAILED DESCRIPTION OF THE INVENTION

Figure 1:
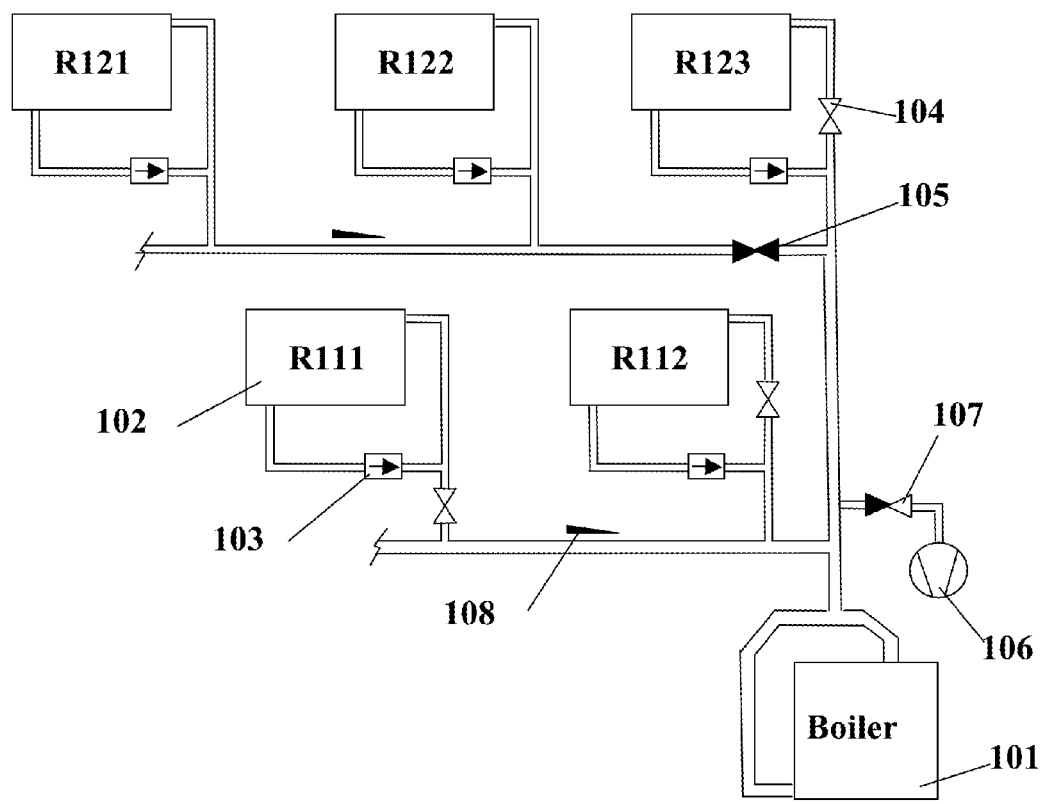
FIG. 1 illustrates a schematic of a single-pipe vapor vacuum system with periodic condensate return according to one embodiment of the present invention.

The following description is merely exemplary in nature and is in no way intended to limit the present disclosure, application, or uses.

In order to solve the aforementioned problems with conventional steam, vacuum, and hot water heating systems, first is presented herein is a novel single-pipe vapor vacuum system having a low temperature periodic condensate return. Second is presented an embodiment of a two-pipe vapor vacuum system without steam traps. Third is disclosed systems and methods for integrating the two-pipe vapor vacuum system with a condensing boiler. Fourth is presented several systems and method of operating radiators with the vapor vacuum system to ensure low temperature condensate return. Fifth are presented several designs for condensing vacuum boilers that can be utilized with the low temperature vapor vacuum system. Sixth is presented a single-pipe vapor vacuum system integration with a condensing boiler. Finally is presented an embodiment of the present invention with a naturally induced vacuum. Certain embodiments will now be described in order to provide an overall understanding of the principles of the structure, function, manufacture, and use of the devices and methods disclosed herein. The features illustrated or described in connection with one embodiment may be combined with the features of other embodiments.

The vapor vacuum system of the present invention can be used in any building and/or dwelling as needed. For the purposes of the descriptions herein, the term "building" will be used to represent any home, dwelling, office building, and commercial building, as well as any other type of building as will be appreciated by one skilled in the art. For purposes of this description, "steam" and "vapor" are used interchangeably. "Single-pipe" and "one-pipe" are used interchangeably and refer to systems with a single pipe used for both feeding vapor to the radiators and returning condensate. "Two-pipe" and "double-pipe" are used interchangeably to refer to systems in which a separate pipe is used to return condensate from the pipe used to feed the vapor to the radiators. As used herein, "closed-loop," "closed loop," and "closed system" are used interchangeably to mean an essentially closed vacuum system and piping with essentially air-tight connections and negligible leakage. The term "steam system" shall refer to positive pressure steam systems, usually operating at up to 2 psig, whereas the terms "vapor vacuum system," "vacuum system," "vapor vacuum heating," and "VVH" shall refer to negative pressure steam systems operating with at least 5 inches Hg vacuum.

Single-Pipe Vapor Vacuum Systems with Periodic Condensate Return

First, a vapor vacuum heating system with a cycling steam (vapor) source used with a plurality of radiators having periodic condensate return is presented. During a heating cycle, condensate is retained in radiators and released later through steam supply line. Such condensate and steam flow alternation eliminates water hammering and justifies usage of smaller diameter tubes and new radiator design. Under vacuum, the system operates like a branched heat pipe with periodic condensate return. In a heat pipe, heat is captured as liquid evaporates at one end, and releases the heat when the vapor condenses at an opposite end. In one embodiment, the system may include a vacuum pump to evacuate air from the system. In another embodiment, the system may include a vacuum check valve on air vent lines and operational procedure to create vacuum naturally by steam condensing in a closed space after complete air purging from the system. The vapor source's cut off pressure can be adjusted to regulate the vapor's temperature depending on the outside temperature.

Temperature control for steam/vacuum systems includes a thermo-regulator in the room farthest from the boiler. Because of higher pressure drop in the pipe, this room is the last one to receive heat, and the boiler shuts off when a set temperature is achieved. Therefore, rooms closest to the boiler are overheated and usually cooled by open windows, while the most distant rooms are under-heated. Uneven steam distribution and building overheating are common problems of such steam heating, especially for single-pipe systems. It is estimated that for every 1° F. increase of internal temperatures, the space heating cost increases by 3%. In summary, an ordinary building's overheating by 14° F. (average 7° F.) corresponds to around 21% more fuel consumption and implies 21% higher heating bills.

To decrease the system's pressure drop and achieve uniform steam distribution, large diameters steel pipes with thick threaded walls have been utilized. In addition, reduced steam velocity in such pipes helps to avoid water hammering when steam and condensate are counter-flowing. Unfortunately, the usage of large diameter heavy steel piping has caused significant problems, including:

(1) Steam supply lines should be preheated to a saturated steam temperature before any steam is delivered into the radiator; the line should be kept at this temperature for the duration of the heating cycle. The average 33.3% difference between the boiler's "gross" and "net" is the heat it takes to bring the system piping up to the steam temperature. "Net" is the heat available to the radiators after the steam has heated the pipes.

(2) The choice of a radiator is limited to heavy cast iron models; these radiators require a long time to heat up and continue to emit heat into the room long after the set temperature is reached and the burner is deactivated.

(3) Expensive installation (4) High heat loss

Converting steam heating systems into known vacuum systems improves heat distribution and system efficiency, but adds maintenance and repair problems. Converted steam systems maintain vacuum at 5-10" Hg, and employ original heavy steel piping, and cast iron radiators; new installation of such vacuum systems would be very expensive.

The entry of forced air systems into the U.S. market shattered the dominance of steam, vacuum, and hot-water heating. The superior quality and efficiency of radiant heat was sacrificed for convection heating, all for the sake of a lower installation cost. Few steam or vacuum heating systems were installed during the last fifty years. Still, many buildings in the U.S. and abroad are heated by steam from either boilers or district systems. Significant savings can be achieved by converting such steam systems into vacuum vapor systems according to some embodiment of this invention. For new high-rise buildings, steam is often a valid choice because of the problems associated with long air ducts (for forced air systems) and with high pressure (for water heating systems).

According to one embodiment of the present invention, what has been developed is a system and method for preventing water hammering in a single-pipe steam heating system by condensate retention in the radiator during the heating cycle and release into the boiler afterward. In one embodiment, a steam (vapor) source is provided for producing and introducing steam into the systems described herein. The steam source may be any source known in the art capable of heating water to produce steam, including a boiler system located within the building, or an external district heating system, heat from power generation, waste heat from industry, and other systems known to provide steam.

A common principle of steam heating operation assumes continuous condensate return into the boiler either through the inlet pipe ("feeder conduit" for single-pipe systems) or via a separate line ("return condensate line" in two-pipe systems). A single pipe system usually employs large diameter pipes in order to avoid water hammering and that requirement subsequently worsens system efficiency, comfort, control, etc. This problem can be resolved by an embodiment of the present invention having a periodic condensate return from the radiators after each heating cycle as shown in FIG. 1.

The system of such an embodiment can be modeled conceptually as a branched "heat pipe," but without a wick and, therefore, no restriction on length. As shown in FIG. 1, while steam is entering into the upper section of radiator 102, condensate accumulates at the bottom and is returned into the steam supply line through condensate flow control valve 103 after heating cycle. Either a float check valve, a thermostatic valve, a zero pressure check valve, or another suitable valve can be used to control condensate return cycles; bubble tight performance is not crucial. Steam delivery can be regulated by a control valve 104 per radiator base (R111, R112, R123) or by a zone control valve 105 per radiator group (R121, R122). The system is connected to a vacuum pump 106 through a vacuum pump control valve 107. In one embodiment, a steam ejector may be utilized to create an initial vacuum in the system; this makes the system self-sufficient and less electricity dependent. Proper plumbing pitch directions 108 should be provisioned for condensate return into the boiler by gravity. Such an arrangement facilitates periodic condensate return only after boiler 101 stops. The benefits of this embodiment of the present invention include:

(1) Hot condensate retaining in the radiator during the heating cycle adds heat into the space to be heated.

(2) After the boiler shut off, the vapor from the boiler continues to deliver heat into the radiators until the vacuum is formed in the system and equilibrium is established.

(3) Turbulent vapor flow regime in smaller diameter tubes ensures that condensate droplets will be carried into the radiator.

(4) Tubes of smaller diameters can be easily connected with fewer fittings and less leaks.

(5) Operating under higher vacuum (up to 29" Hg or even higher), and utilizing modern plumbing, radiators, and a control models, rather than the existing vacuum systems operating at 5-10" Hg.

Saturated water vapor pressure in the boiler is a function of temperature and vice versa (Table 1). The vapor temperature at the radiators' entrances (and therefore the temperature of the radiators) can be controlled in a broad range by the temperature/pressure setting of the boiler. For example, at 2 psi pressure drop in the tubing and a boiler pressure of 10.3 psia, vapor will enter into the radiators at 8.3 psia@184.6° F., and at boiler pressure of 9.3 psia, vapor will enter into the radiators at 7.3 psia@178.9° F., correspondingly. So the radiators' temperature can be controlled by changing temperature/vacuum level in the boiler.

TABLE 1

Properties of Saturated Steam

| Saturated Steam Pressure | Pressure in System | | Temperature | |
|---|---|---|---|---|
| (inch Hg) | inch Hg | psia | ° F. | ° C. |
| 0.0 | 29.74 | 0 | 32 | 0.0 |
| 5.7 | 24 | 2.8 | 140.3 | 60.2 |
| 10.7 | 19 | 5.3 | 165.2 | 74.0 |
| 12.7 | 17 | 6.3 | 172.5 | 78.1 |
| 14.7 | 15 | 7.3 | 178.9 | 81.6 |
| 16.7 | 13 | 8.3 | 184.6 | 84.8 |
| 18.7 | 11 | 9.3 | 189.7 | 87.6 |
| 20.7 | 9 | 10.3 | 194.4 | 90.2 |
| 22.7 | 7 | 11.2 | 198.8 | 92.7 |
| 29.7 | 0 | 14.7 | 212 | 100.0 |

Similar to modern air conditioning applications, a vacuum in this leak-tight system is created once by a vacuum pump and restored on rare occasions. Alternatively, achieving and maintaining a vacuum level of 26-29" Hg (versus 29.9" Hg for air conditioning application) is simpler, less expensive, and the water vapor is not an environmental pollutant (unlike Freon and other chlorofluorocarbons used in air conditioning systems).

Depending on the outside conditions, the temperature of the vapor supplied into the radiators may be adjusted by controlling the system operating interval in the vacuum; the deeper the vacuum, the lower the vapor's temperature. Modern copper plumbing is warranted for many years, so the system dependency on the tightness to leaks and, therefore, on electricity for vacuum pump is reduced. In one preferred embodiment, polysulfone type tubing can be utilized for steam conduit and flexible Teflon type tubing for end-point connections to radiators; both thermoplastics' properties exceed the vacuum heating system operational parameters.

Two-Pipe Vapor Vacuum Systems without Steam Traces

Second is presented an embodiment of a two-pipe vapor vacuum system without steam traps. In a typical vacuum heating system, steam traps and/or thermostatic steam traps, are utilized like in a steam system. The purpose of conventional steam traps is to periodically release condensate back into the boiler and to prevent steam from entering into return lines. Such steam traps are a major maintenance problem requiring routine inspections, repairs, and replacement.

Figure 2:
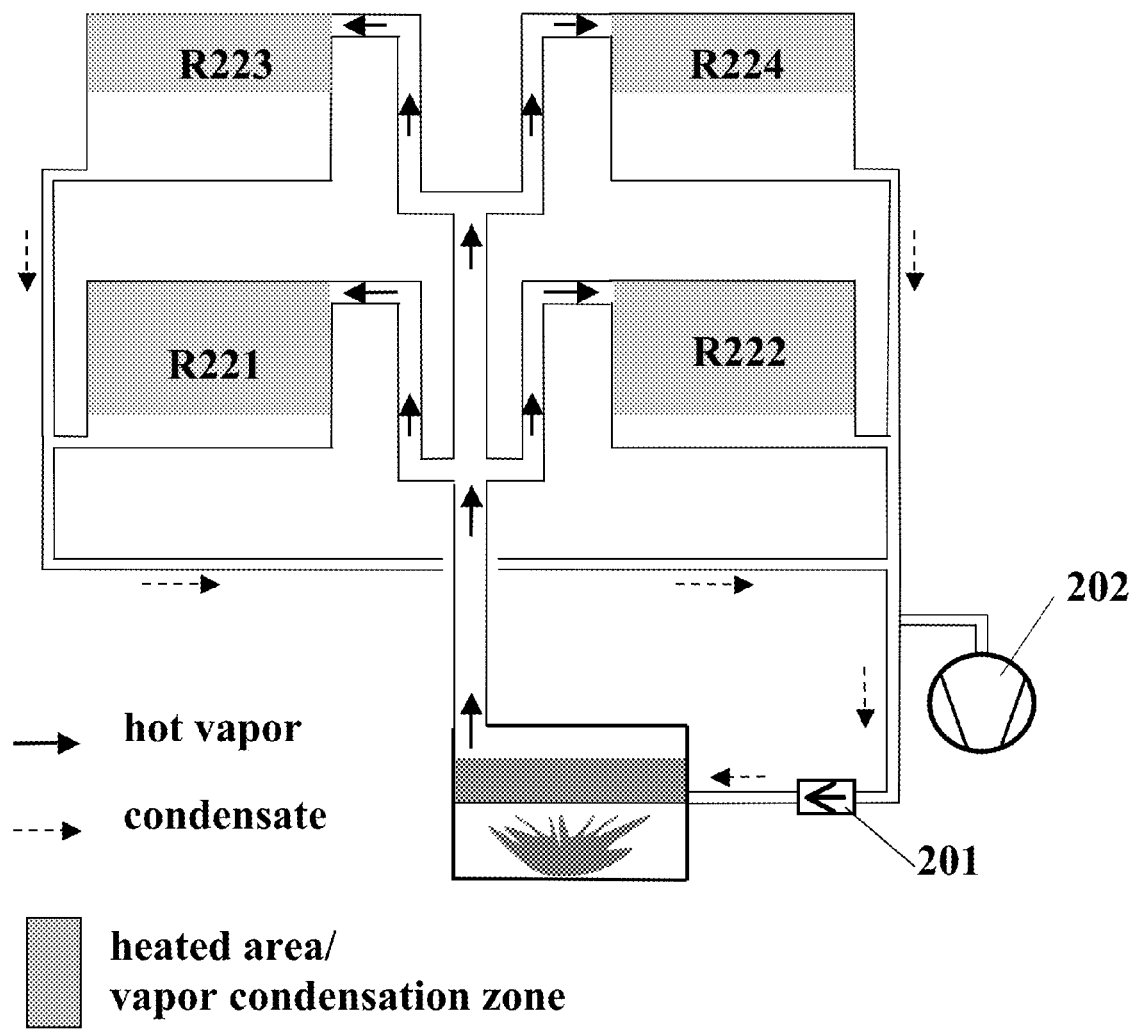
FIG. 2 illustrates a schematic of a two-pipe vapor vacuum heating system adapted to operate without steam traps according to another embodiment of the present invention.

One embodiment of the vapor vacuum system, operating in vacuum/pressure interval from initial vacuum of 28-29" Hg and up to 2 psig (recommended maximum pressure for steam systems), was tested with lightweight supply lines and radiators as shown in FIG. 2. Vacuum was created initially and restored (if necessary) by vacuum pump 202, and check valve 201 was used to prevent boiler backflow. It was found that the vapor vacuum system according to one embodiment can operate successfully without steam traps. Vacuum, created in each radiator by condensing vapor, keeps the condensate from leaving the radiator in the form of a natural plug at the radiator bottom. Because of the short heat cycle period, the level of accumulated condensate is not significant enough to reduce radiator heat transfer area. When the radiator is heated from top to bottom as in radiators R221 and R222, the pressure of saturated vapor inside the radiator increases, and vapor from the boiler is directed to other less heated radiators R223 and R224. The boiler stops when the pressure/temperature rises to an upper set point, the pressure equalizes in the idle system and condensate returns by gravity from each radiator. When the boiler temperature drops to a low set temperature (or corresponding pressure), another heating cycle starts until the set temperature in a heated space is achieved. Accordingly, in one embodiment, no steam traps are necessary.

Figure 3:
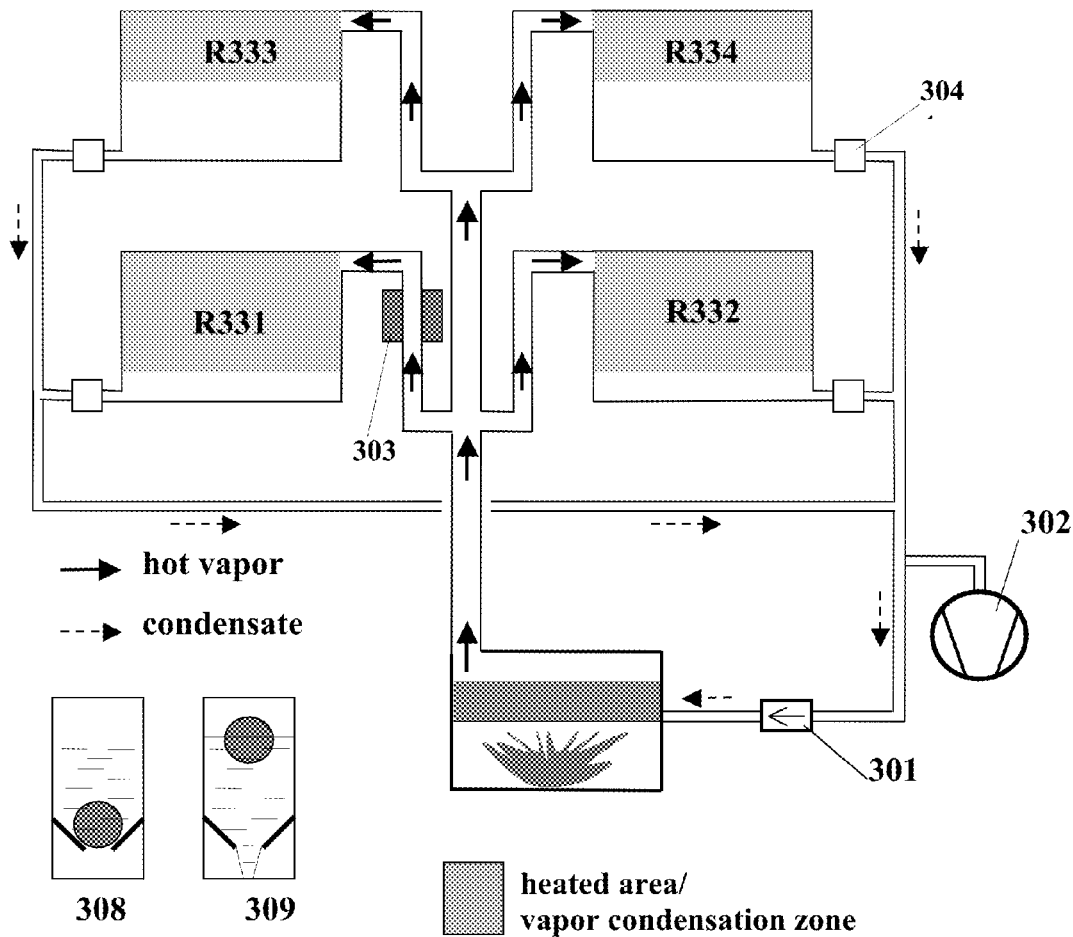
FIG. 3 illustrates an operation of the two-pipe vapor vacuum heating system operating with control valves on supply lines and check valves on condensate return lines according to yet another embodiment of the present invention.

This natural heat distribution balance can be disrupted if supply line is closed by flow control valve on any radiator. As an example, shown in FIG. 3, vapor from nearby radiator R333 will enter radiator R331 through a condensate return line if a control valve 303 is closed. To prevent vapor entering the condensate return line, each radiator is equipped with a float ball check valve 304. When the radiator is heated from top to bottom during the heating cycle, the ball is pressed down, and the float ball check valve is closed (FIG. 3, insert 308). When the boiler stops and pressure/vacuum equalize throughout the system, the ball floats and releases condensate to the boiler (FIG. 3, insert 309). In contrast to traditional steam traps, in a float ball check valve, there is no intermediate condensate release during heating cycle. A float ball check valve is employed for condensate handling on each radiator; this simple, reliable, and inexpensive device works consistently, whether the system is working under pressure or under a vacuum. Because vapor and condensate flow are alternating on the same line, water hammering can be prevented, which allows for the usage of smaller diameter tubing. Optionally, and according to alternative embodiments of the present invention, heat activated valves may be utilized on condensate return lines instead of float ball valves. As in FIG. 2, vacuum was created initially and restored (if necessary) by vacuum pump 302, and check valve 301 was used to prevent boiler backflow.

Therefore, one embodiment of the present invention eliminates the need for steam traps, which are expensive inspection and maintenance problems for steam and existing vacuum heating systems.

Accordingly, one embodiment of the present invention is a vapor vacuum heating system with a plurality of radiators, comprising a vapor source; a feeder conduit connecting said vapor source to the radiators; a condensate return conduit having no steam traps on each radiator connected to said feeder conduit; a float ball check valve on said condensate return conduit to prevent vapor entering condensate return line during the heating cycle and releasing condensate after the heating cycle; a vacuum pump to evacuate the system; a thermostat in the space to be heated; a vapor source control unit; and a pressure sensor for generating a signal to the vapor source control unit, wherein an air from the system is evacuated by the vacuum pump, and wherein the vapor source is switched on and off by the vapor control unit within preset pressure until the temperature in the space to be heated is equal to a thermostat set temperature.

Two-Pipe Vapor Vacuum System Integration with Condensing Boilers

Third is disclosed systems and methods for integrating the two-pipe vapor vacuum system with a condensing boiler (CB).

Figure 4:
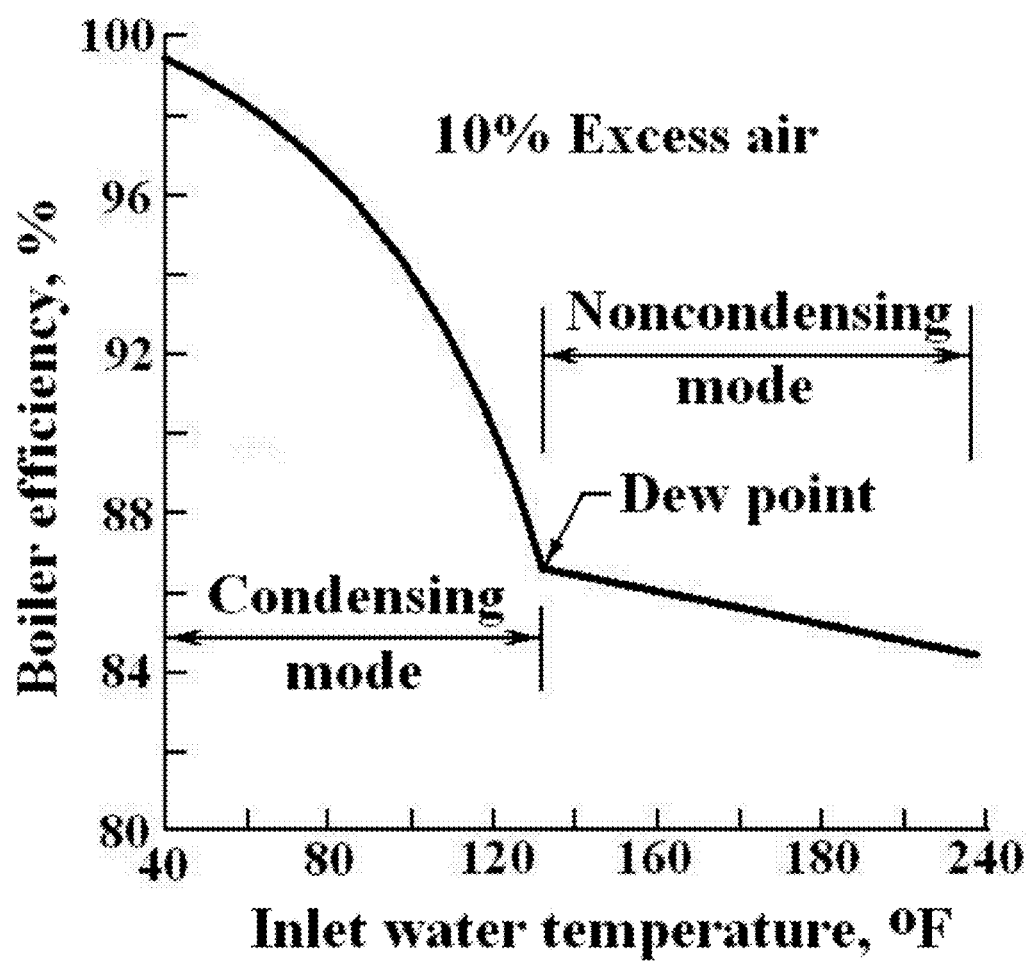
FIG. 4 illustrates a thermal efficiency of a hot water condensing boiler system as a function of return condensate temperature.

In order to boost energy efficiency, modern hot water CB absorb the latent heat of water vapor from the flue gas. Recommended temperature of water return temperature (supply into boiler condensing section) is below 100° F. in order to condense most of the water (see FIG. 4, adapted from T. H. Durkin, "Boiler System Efficiency," ASHRAE Journal, vol. 48, July 2006, p. 51). In reality, water return temperature is at 140° F. level for most of the heating season in order to deliver enough heat into building. As a result, benefits of condensing mode usage are lost. Another problem of hot water CB is limited temperature of supply water. Typical temperature drop through hot water heating systems is 20° F. and therefore for CB supply water temperature is limited to 120-160° F. At such low temperatures, the energy value of delivered heat is less than in regular hot water systems.

The temperature of condensate return in traditional vacuum single-pipe systems is either equal to the temperature of vapor rising through the same pipe or slightly lower in two pipe systems. The high temperature of condensate return is considered an inherent feature of traditional vacuum and steam systems and is never challenged. The present inventor has recognized that lowering the temperature of condensate return would improve system efficiency and reduce heat losses.

Figure 5:
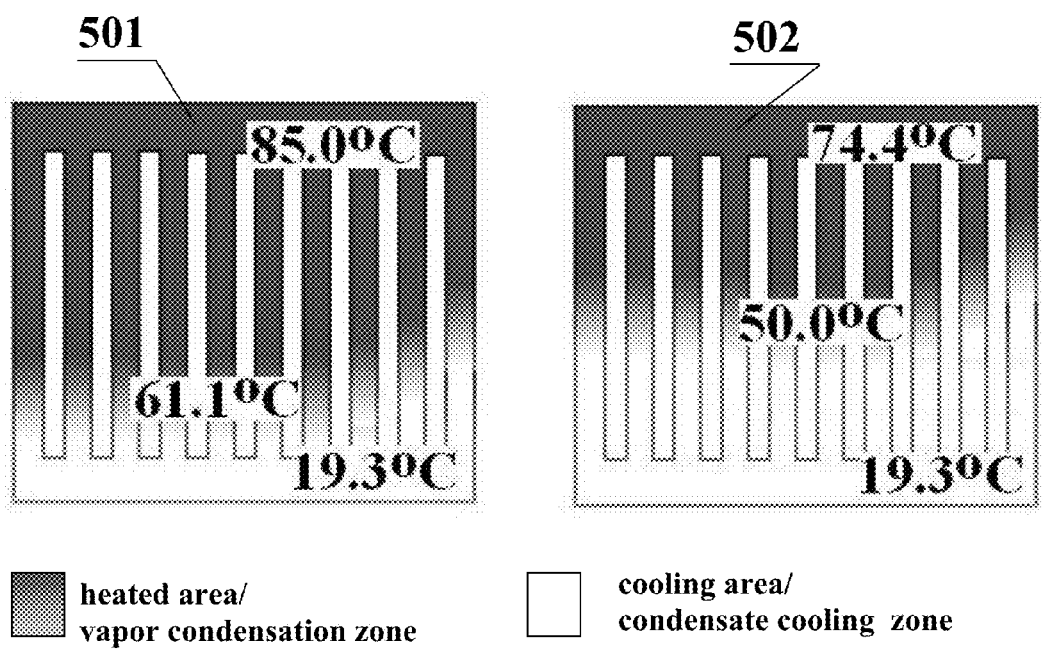
FIG. 5 illustrates a thermal image of a flat panel radiator according to one embodiment of the present invention during an operational test run.

Typical thermal images of the radiator in the proposed two-pipe vapor vacuum system are shown in FIG. 5 after the boiler was stopped at 10" Hg (after 7 and 20 minutes, 501 and 502, respectively). It shows the remarkably even temperature of the heated area at the radiator top and area of low temperature at the bottom. The phenomenon can be explained by the fact that latent heat of water evaporation/condensation represents 85-90% of total vapor heat. Due to this, a small portion of the radiator surface is sufficient to cool the condensate to room temperature (dissipate heat of saturated liquid). This test finding suggested a possible way to improve the system's efficiency by integrating condensing boiler technology into the vapor vacuum heating system.

In the vapor vacuum system described in this application, the "return temperature versus efficiency" dilemma can be resolved. Condensing boiler integration into vapor vacuum system not only eliminates restrictions on operation parameters (which are imposed in hot water systems), but can also add significant benefits in design, safety, maintenance, efficiency and installation costs. The vapor vacuum system described in this application can keep radiators hot up to 212° F. and yet still return condensate at temperatures below approximately 100° F. into the condensing section at the same time.

The various vapor vacuum heating systems presented herein can be integrated with a condensing boiler, to create overall system efficiency improvements. Such a system comprises a condensing boiler, at least one radiator located in the space to be heated, an apparatus (vacuum pump, steam ejector, etc.) to evacuate air from the system, vapor transfer line(s) extending between the boiler and the radiator(s), and return line(s) for condensate return. The boiler oscillates within a predefined vacuum/temperature interval until a set temperature is achieved. Condensate from the radiator(s) is returned back by gravity into the boiler's condensing section. Several methods are proposed to reduce the temperature of radiators' condensate return into the boiler in order to integrate the system with condensing boilers. Later, a design for a vacuum condensing boiler which can be utilized with the present invention is presented.

Figure 6:
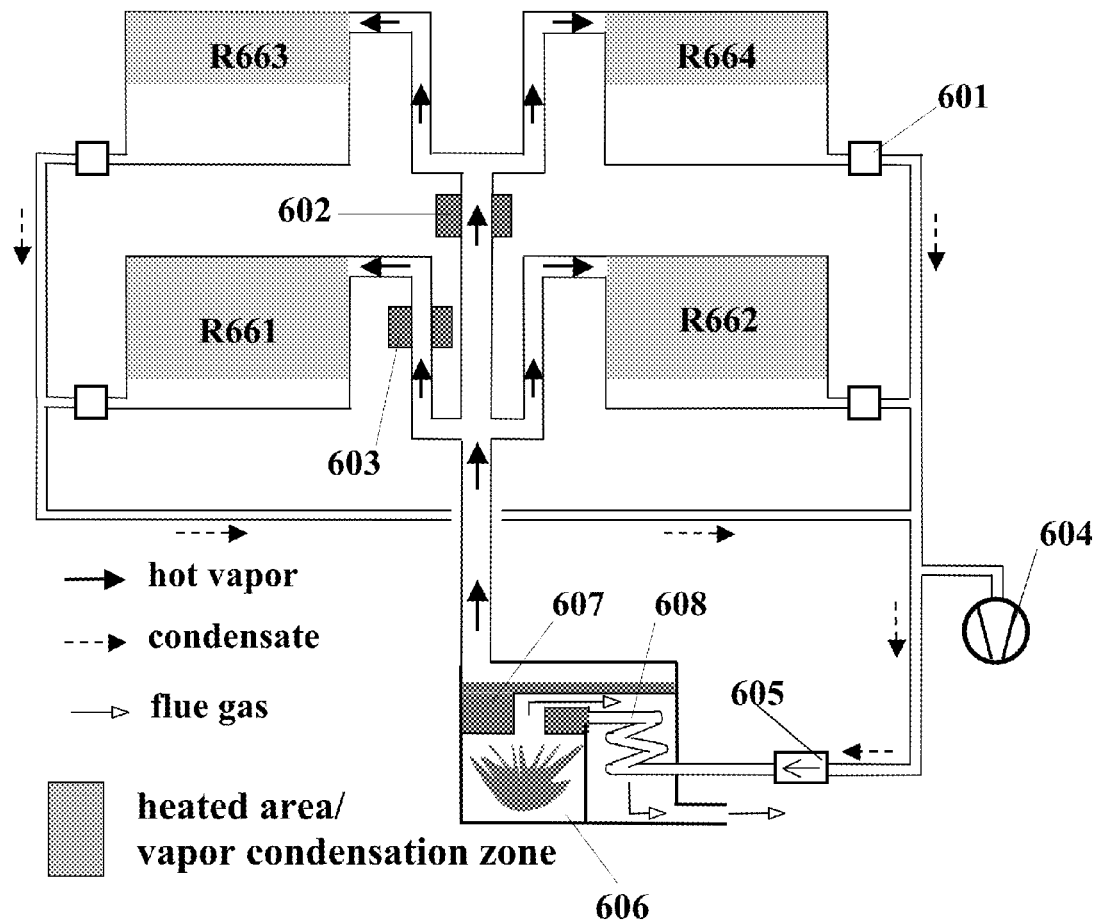
FIG. 6 illustrates one method of integrating a vapor vacuum system according to the present invention with a vacuum condensing boiler according to another embodiment of the present invention.

In one embodiment of the present invention, the various embodiments of the vapor vacuum heating systems described in this application may be integrated with a condensing boiler. A schematic of a two-pipe vapor vacuum heating system integration with a condensing boiler according to one embodiment of the present invention is shown in FIG. 6. The condensing boiler comprises a burner 606, an evaporating section 607, and a condensing section 608. In one embodiment, each radiator is equipped with a heat activated valve (HAV) 601 at an exit of the condensate return line. During the heating cycle, HAV 601 at the exit of the hottest radiators (radiators R661, R662 which are nearest to the boiler) are closed, and hot condensate is accumulating at the bottom. At the same time, condensate flows back into the boiler from partially heated radiators R663, R664. Zone control valve 602 and radiator control valve 603 can be utilized for heat distribution control. Vacuum in the system is created and maintained by a vacuum pump 604, and check valve 605 prevents hot water backflow from boiler during heating cycle.

Figure 7:
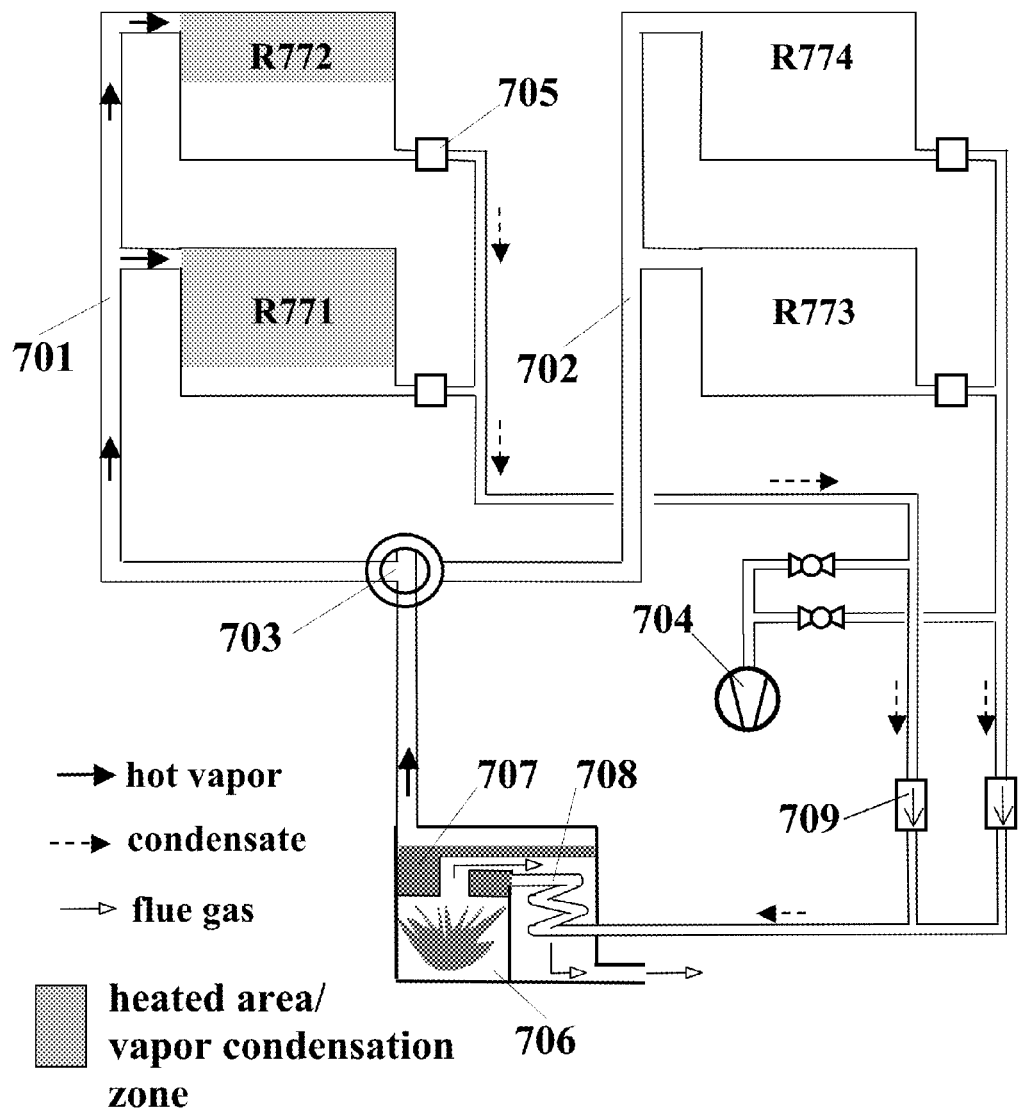
FIG. 7 illustrates a schematic of a vapor vacuum heating system having multiple risers and a control manifold/set of valves according to yet another embodiment of the present invention.

In a two-pipe vacuum system with multiple risers, a manifold (set of valves) can be utilized to alternate heat supply into the multiple risers. An example of a two-riser system is shown in FIG. 7. The condensing boiler comprises a burner 706, an evaporating section 707, and a condensing section 708. While radiators R771 and R772 on riser 701 are receiving heat, vacuum is naturally created in cooling radiators R773 and R774 on riser 702, and vise versa (when manifold 703 turns). The frequent boiler on/off switching can be reduced for multiple-section systems. Condensate from radiators returns through heat activated valves (HAV) 705 on each radiator (or solenoid or check valve) into condensing section 708 of the boiler in an idle system. Vacuum in the system is created and maintained by a vacuum pump 704, optionally vacuum can be restored in a separated cooled section 702. Check valve 709 prevents hot water backflow from boiler during heating cycle. If required, manifold 703 can be utilized to close boiler vapor supply line completely, and vacuum level in the system can be restored by vacuum pump without waiting for boiler cooling to 100° F.

The efficiency of the regular non-condensing steam boilers integrated into a two-pipe vacuum heating system is expected to improve due to operation in vacuum, lower temperature of return condensate, and ability to control vapor temperature depends on the outside temperature. In some embodiments, it is possible to use the proposed system with regular non-condensing boilers; the condensing section elimination from the boiler would benefit the boiler maintenance, life expectancy, and cost.

In some embodiments, instead of a boiler, other heat sources may be utilized for the vapor vacuum system described herein, such as district heating, micro-turbine exhaust, heat and power cogeneration heat, waste heat, geothermal, solar, etc.

Radiator Designs Having Low Temperature Condensate Return

Fourth are presented several systems and method of operating radiators with the vapor vacuum system to ensure low temperature condensate return.

Figure 8:
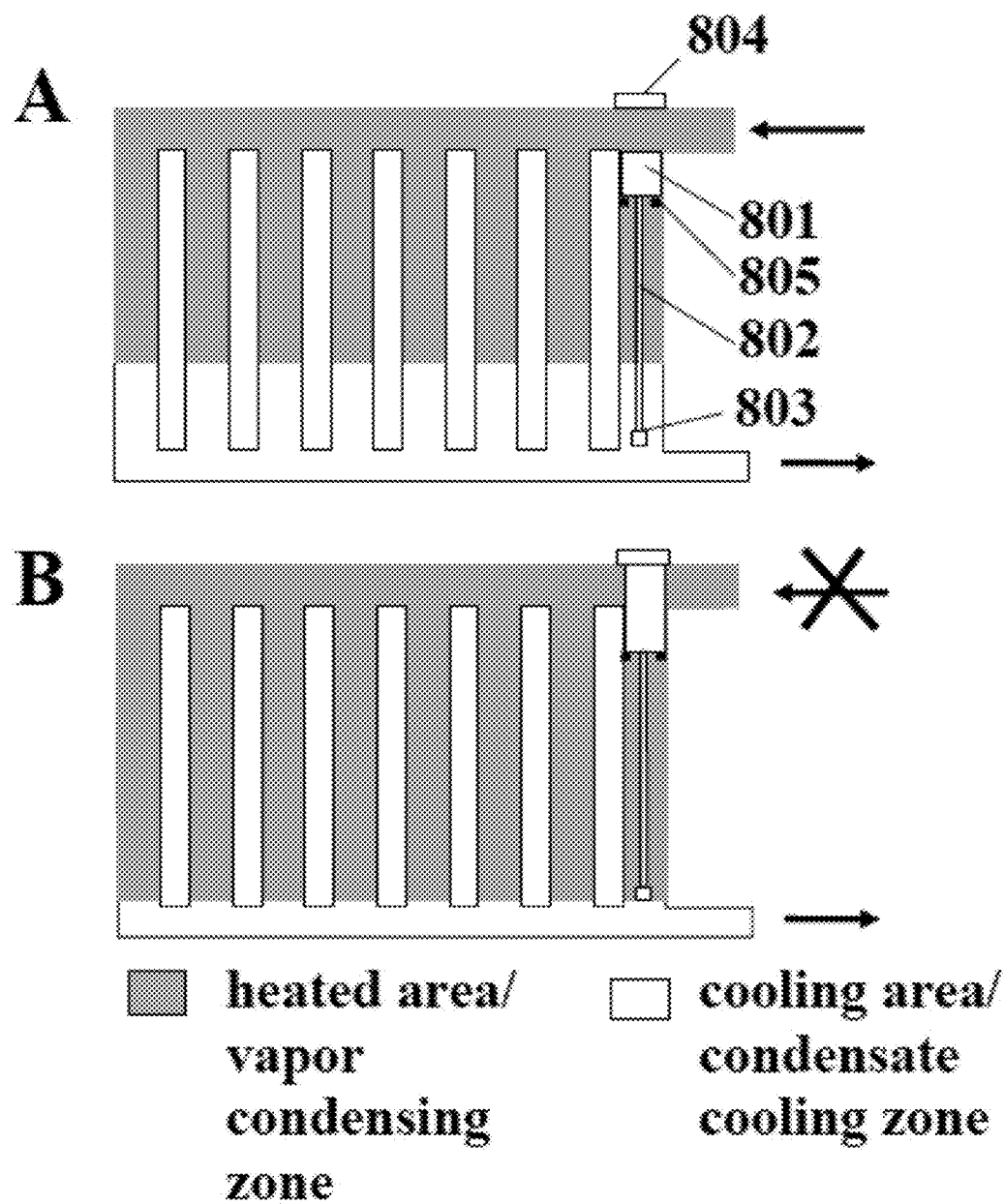
FIG. 8 illustrates a schematic of an improved flat panel radiator with a build-in heat-activated valve (HAV) according to another embodiment of the present invention for use with a vapor vacuum heating system.

A schematic of a flat panel radiator with a build-in heat-activated valve (HAV) is shown in FIG. 8. The valve includes a bellow 801 connected by a capillary 802 to a capsule 803 containing a low temperature boiling fluid (such as pentane, acetone, etc) or wax inside. When the radiator bottom gets hot, the condensate heats the capsule and the evaporated liquid/wax expands the bellow 801 to close radiator (as shown in FIG. 8, part B). When the radiator bottom cools down, condensed liquid drains back into the capsule 803 and the contracted bellow 801 opens the radiator entrance (FIG. 8, part A). During the heating cycle, the valve occasionally opens and closes, keeping the radiator heating area hot and condensate temperature low. The valve is inserted through a radiator plug 804, into a position fixed by nibs 805 and can be easily accessed for inspection and/or replacement. The bellow type valve described here may be a reliable and economical alternative to the HAV. In one embodiment, a backup HAV at each radiator exit is an optional safety feature.

Figure 9:
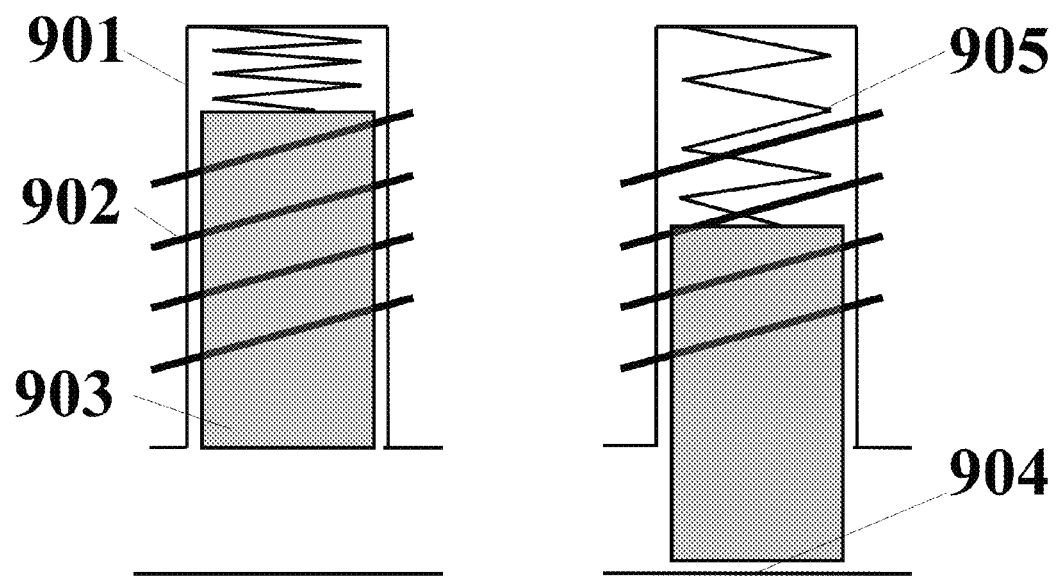
FIG. 9 illustrates a schematic of an enclosed control valve according to one embodiment of the present invention for use with a vapor vacuum heating system.

A room/zone temperature controller coupled with a solenoid valve is a common solution today for building's heat distribution control, but the seal on the valve stem usually develops leaks with time and usage. In one embodiment, the problem may be resolved with a new enclosed valve design for a vapor supply line into radiators as shown in FIG. 9. A magnet 903 inside plastic tube 901 and induction coil 902 is locked into orifice seat 904 by a retractable mechanism and spring 905 to block vapor flow. In some embodiments, a turning movement may be added to extend life-time. These valves are not expected to close the supply line bubble-tight, but 90-95% of passage closing would suffice to control heat distribution. FIG. 9 (left), shows the valve open, and FIG. 9 (right) shows the valve closed.

In summary, heat distribution through the system is controlled by radiator size (heating area), HAV which is either build-in or located on condensate return line, room controllers, and boiler operating parameters adjusted to the outside temperature.

The system according to this embodiment has the following major differences relative to a single-pipe VVH:

(1) Condensate return line(s) from the radiators to the boiler condensing section, in which plastic tubing can be employed because of the low temperature condensate return.

(2) HAV on condensate return line from each radiator. Optionally, a backup HAV at the condensate entrance into boiler condensing section may be used to prevent radiators' HAV malfunction; and paper thermometer indicators on each condensate return line can be used to locate a failed HAV.

Vacuum Condensing Boiler Designs

Fifth are presented several designs for condensing vacuum boilers that can be utilized with the low temperature vapor vacuum system. Since the various vapor vacuum system embodiments according to the present invention allow integration of condensing boilers for the first time, vacuum condensing boilers are desirable for use with the present invention. Because of the various embodiment innovations described in this application, vapor vacuum heating systems with vacuum condensing boilers are feasible to use for the first time. Accordingly, embodiments of the present invention also include vacuum condensing boilers as described below. Various condensing boiler designs are envisioned to be useable with the present vapor vacuum system, and the particular condensing boiler designs are not intended to limit the scope of the present invention.

An attractive feature of the vapor vacuum heating system is advanced heat transfer conditions. Heat transfer coefficients in the boiler are changed by orders of magnitude depending on temperature differences between the wall and boiling temperature of the saturated liquid (Farber-Scorah Boiling Curve, see, for example, FIG. 6.14 in P. K. Nag, *Heat and Mass Transfer*, 2nd Ed., 2007 and FIG. 5.1 in M. L. Corradini, *Fundamentals of Multiphase Flow*, 1997). Hot water boilers work in the least efficient regime of interface evaporation (pure convection). Furthermore, in hot water systems, the "bubbles" regimes, which have the highest heat transfer coefficients, are avoided because the hot water circulation worsens in the presence of the vapor phase. Conversely, in a vacuum system, heat transfer instantly occurs in the most efficient "bubbles" regime because water boils at lower temperatures. Therefore, the required heat exchange area can be reduced significantly not only in the boiler evaporative section, but also in the boiler condensing section.

Figure 10:
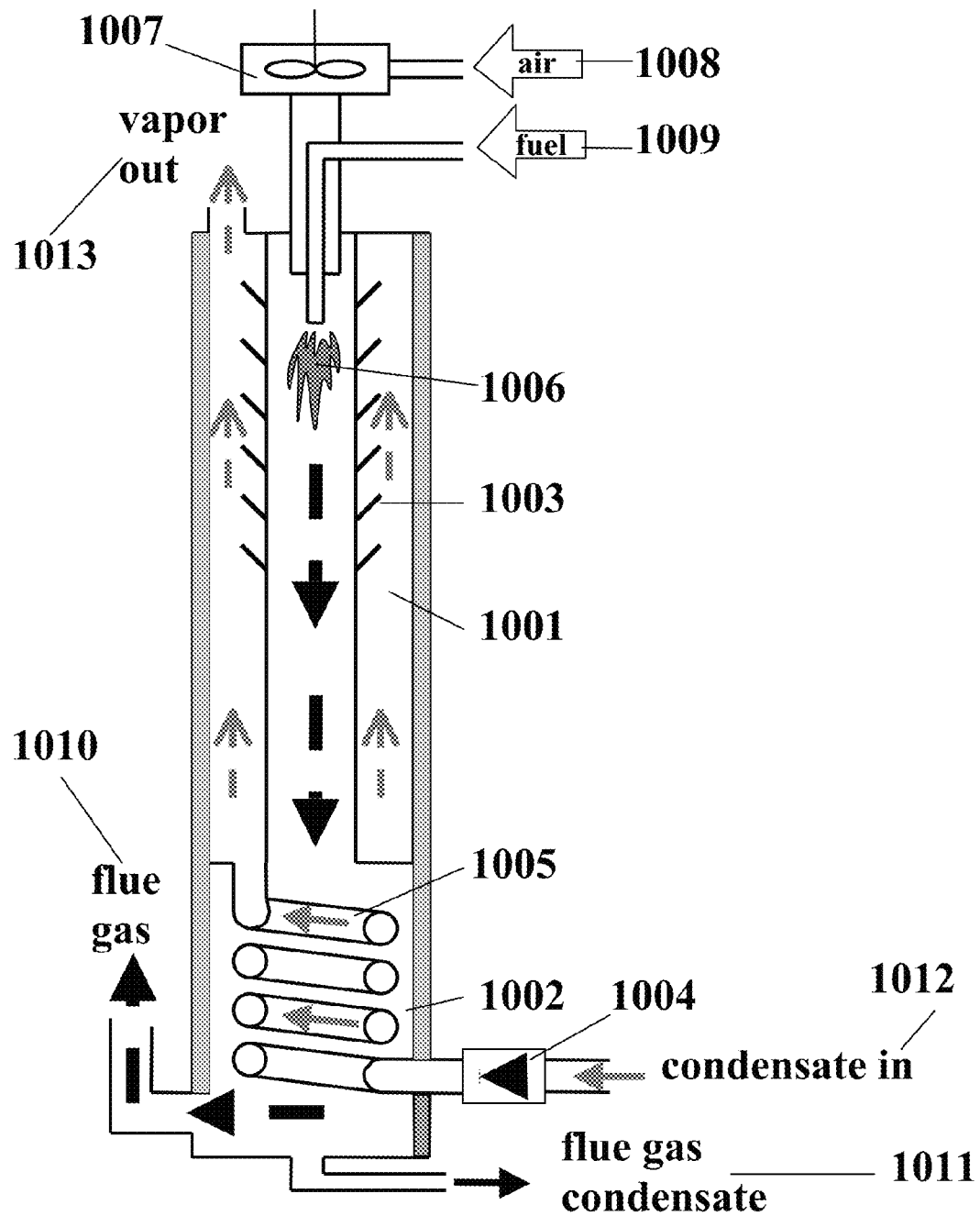
FIG. 10 illustrates a schematic of one embodiment of a vacuum condensing boiler according to another embodiment of the present invention.

FIG. 10 illustrates a schematic of a vacuum condensing steam boiler with a single pass down flow configuration according to one embodiment of the present invention. Two- and three-pass apparatus may be used as well. High temperature flue gas from a burner 1006 evaporates water in a boiler cylindrical evaporating section 1001 and then flows down into a condensing section 1002 along a spiral tube heat exchanger 1005 filled with condensate return from the radiators. Air 1008 and fuel 1009 are supplied from the boiler top; an air blower 1007 is utilized to start the system. Cold condensate 1012 from radiators enters into the spiral tube heat exchanger 1005 from the bottom of the boiler and rises up due to hot water's lower density, boils, and exits the boiler as vapor phase 1013. Condensate 1012 from the radiators periodically returns into the boiler through a back flow valve 1004 when the boiler stops and the system pressure equalizes. To avoid a sharp decrease in the heat transfer in the evaporating section due to transition into film boiling, fins 1003 are provisioned to direct vapor phase outward from the heat exchange area in the evaporating section 1001 of the boiler. Flue gas 1010 leaves the boiler bottom through an exhaust line, while flue gas condensate 1011 is removed from the boiler bottom through a separate line.

Figure 11:
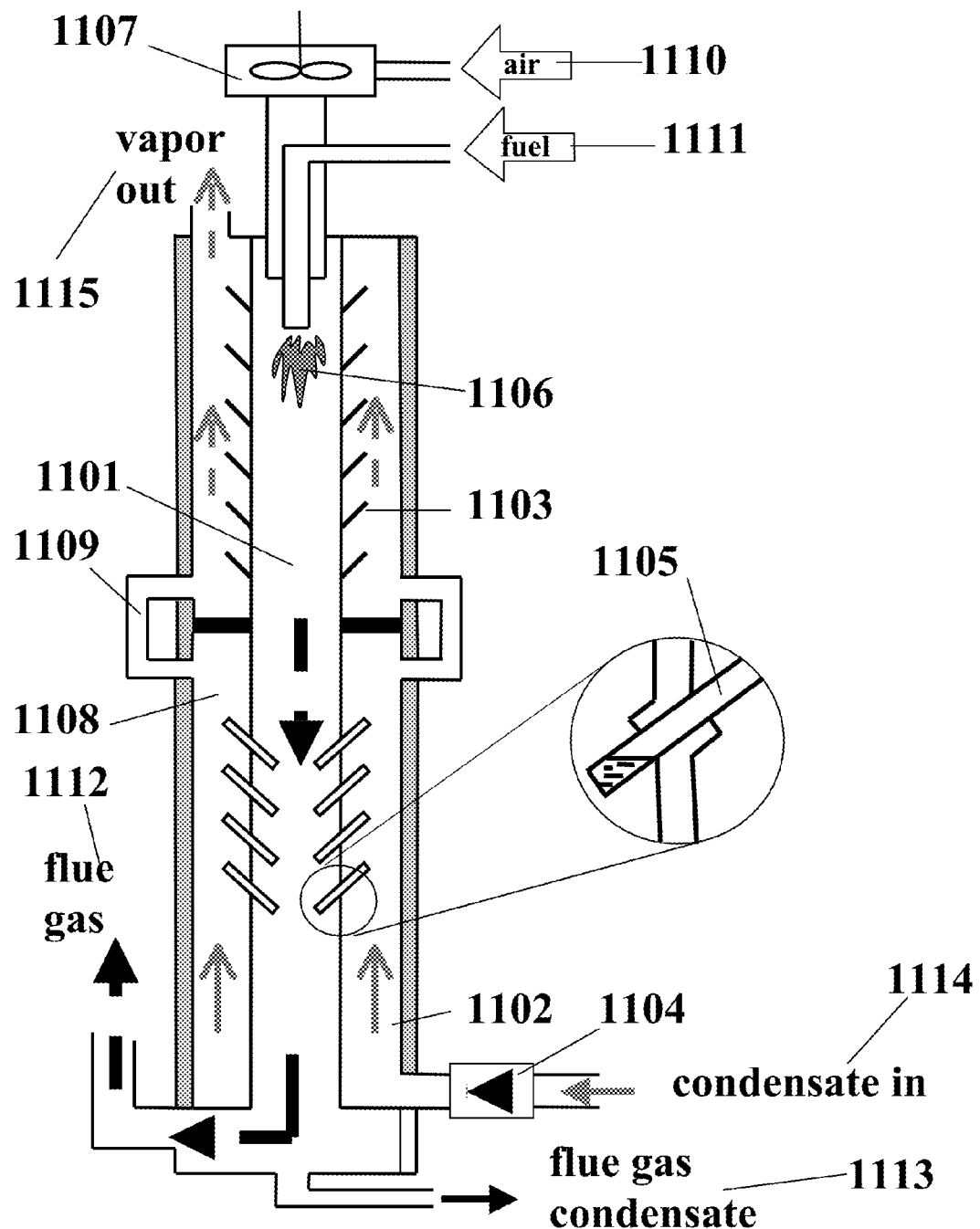
FIG. 11 illustrates a schematic of another embodiment of a vacuum condensing boiler according to yet another embodiment of the present invention.

In one alternative embodiment of the vacuum condensing boiler, an array of short thick wall heat pipes can be utilized in the condensing section instead of the spiral tube heat exchangers, as shown in FIG. 11. High temperature flue gas from a burner 1106 evaporates water in a boiler cylindrical evaporating section 1101 and then flows down into a condensing section 1102. Heat pipes 1105 are threaded through the inner wall of the condensing section 1102. These heat pipes have no wick capillary structure; instead, they comprise short, closed-end tubes with a working liquid under vacuum (water can be used as a working liquid in some embodiments). The condensing section 1102 comprises two semi-cylinders 1108 connected to the evaporating section 1101 by lines 1109 that can be taken apart for the heat pipes' inspection and replacement. Although the tips of these heat pipes 1105 will be exposed to corrosive flue gas, the condensing section 1102 would still be functional if the walls of one or several heat pipes fail. Air 1110 and fuel 1111 are supplied from the boiler top; an air blower 1107 is utilized to start the system. Cold condensate 1114 from the radiators enters from the bottom of the boiler and rises up due to hot water's lower density, boils, and exits the boiler as vapor phase 1115. Condensate from the radiators periodically returns into the boiler through a back flow valve 1104 when the boiler stops and the system pressure equalizes. To avoid a sharp decrease in the heat transfer in the evaporating section 1101 due to transition into film boiling, fins 1103 are provisioned to direct the vapor phase outward from the heat exchange area in the evaporating section of the boiler. Flue gas 1112 leaves the boiler bottom through an exhaust line, while flue gas condensate 1113 is removed from the boiler bottom through a separate line.

Some Illustrative Alternative Embodiments

Various alternative embodiments are envisioned to be within the scope of the present invention. Some of these illustrative alternative embodiments are described below. Other embodiments not described here will also be apparent to one of ordinary skill in the art.

Single-Pipe Vapor Vacuum System Integration with Condensing Boilers

Figure 12:
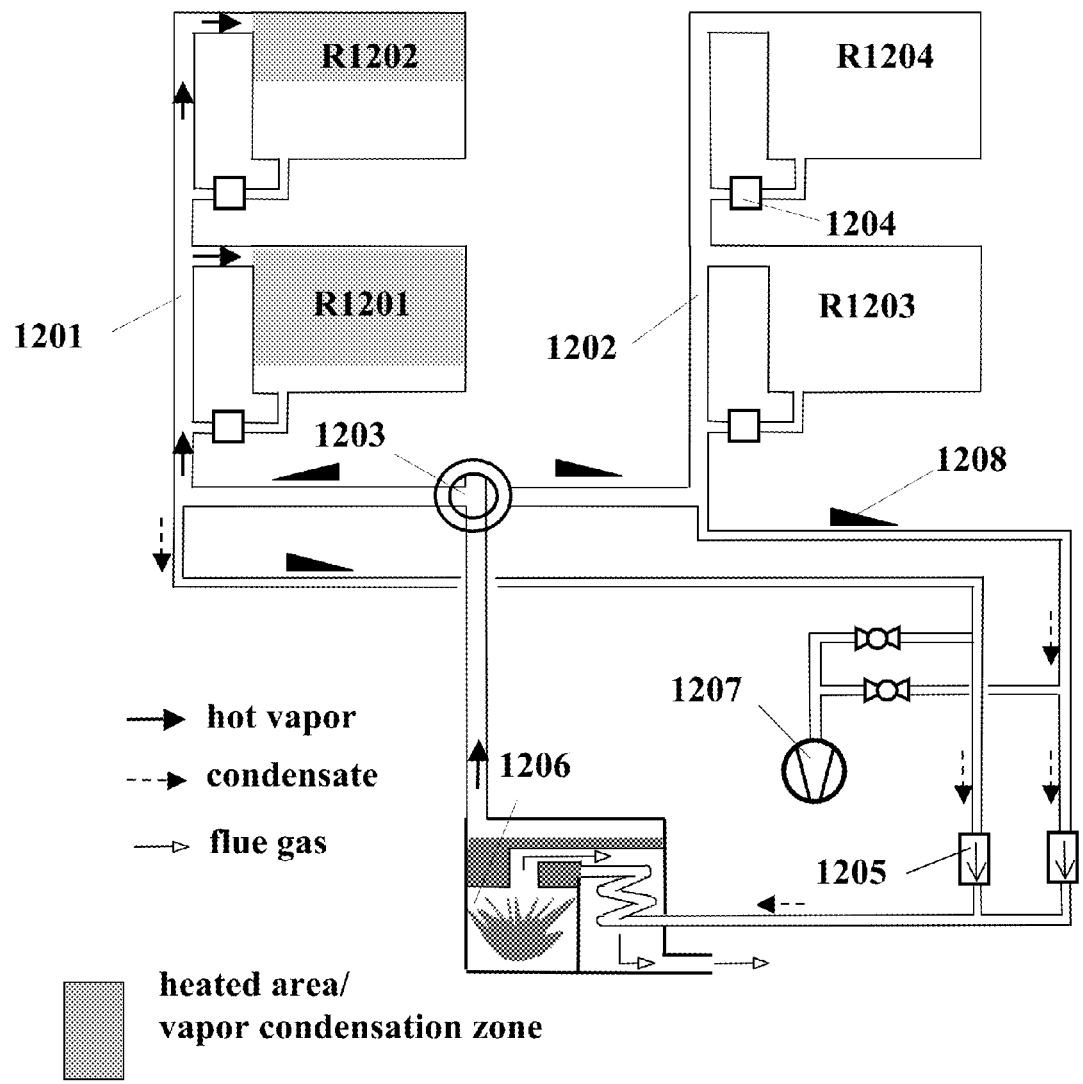
FIG. 12 illustrates a schematic of yet another embodiment of the present invention in which a single-pipe vapor vacuum heating system is integrated with a vacuum condensing boiler.

Sixth is presented a single-pipe vapor vacuum system integration with a condensing boiler. FIG. 12 illustrates a single-line vacuum system which may be integrated with a condensing boiler. A single-pipe system is partitioned into section 1201 and section 1202 using a manifold (or set of valves) 1203. When section 1201 is in heating cycle, section 1201 is connected to the evaporating section of a condensing boiler 1206 by the manifold 1203. When section 1202 is in cooling cycle, condensate released from radiators R1203 and R1204 flows through heat activated valves 1204 and accumulates above backflow valve 1205 leading to the condensing section of the boiler 1206. If required, vacuum in cooling section 1202 can be restored by a vacuum pump 1207. Line pitching 1208 is provisioned for proper condensate flows. When the cycle is reversed on sections 1201 and 1202, condensate accumulated above backflow valve 1205 flows into the condensing section of the boiler 1206.

Accordingly, another embodiment of the present invention is a heating system having a closed-loop single-pipe vapor vacuum distribution system having periodic condensate return and a vacuum condensing boiler, the system comprising a vapor source adapted to generate vapor, the vapor source comprising an evaporating section and a condensing section; one or more radiators; a feeder conduit connecting said vapor source to said radiators; a return conduit for returning condensate from each radiator back to said vapor source, wherein said return conduit contains no steam traps; a vacuum pump to evacuate air from the system to a vacuum level, wherein the vapor source, the feeder conduit, and the return conduit are air-tight; a temperature sensor adapted to sense a temperature of the vapor leaving the vapor source; a pressure sensor adapted to sense a pressure of the vapor source; and a control unit for controlling the vacuum condensing boiler and the vacuum pump based on the temperature and the pressure sensed by the temperature sensor and the pressure sensor to maintain a consistent vacuum level and a consistent temperature of the vapor, wherein the return conduit returns said condensate from the radiators to the condensing section at a temperature below approximately 100° F. sufficient for condensing water from flue gas from a burner in the vapor source.

Alternative Temperature-Regulated Radiator Design

Figure 13:
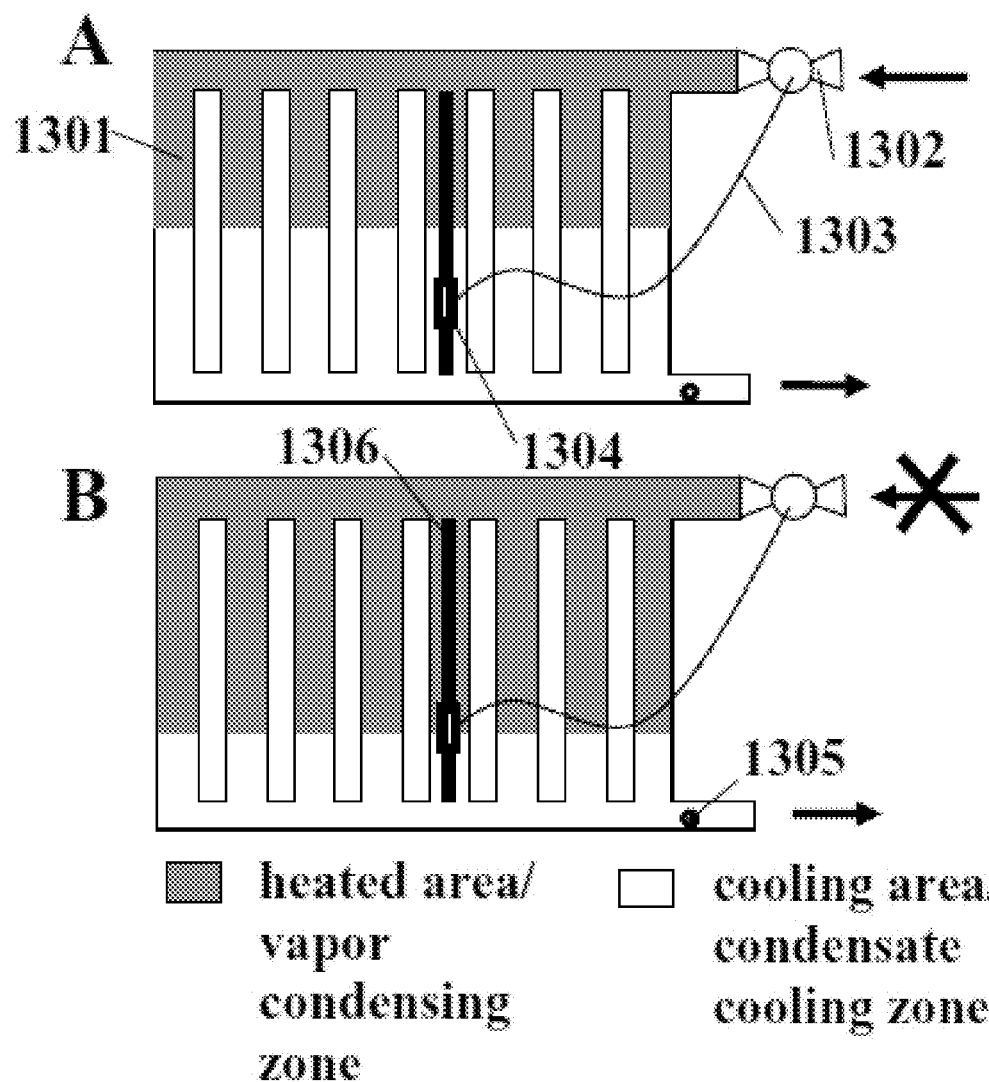
FIG. 13 illustrates a schematic of an embodiment of a radiator design having a temperature controlled sliding member for controlling a temperature profile in the radiator according to yet another embodiment of the present invention.

FIG. 13 illustrates an alternative embodiment of a temperature-regulated radiator 1301 design according to yet another embodiment of the present invention. A temperature-regulated valve 1302 controls heat supply into radiator 1301 based on a signal from temperature sensing element 1304 located in a space to be heated and connected to valve 1302 by capillary 1303. The sensing element 1304 setting is set to about 100° F. and attached to the radiator by sliding bar 1306. Heat supply into the radiator is controlled by temperature sensing element 1304 along sliding bar 1306; at the same time, the temperature of condensate return is limited to about 100° F. to ensure maximum condensing efficiency of the boiler. Configuration A shows radiator open when preset area is not heated yet, and configuration B shows radiator closed when preset area is heated.

Accordingly, another embodiment of the present invention is a radiator comprising a temperature regulated valve on a vapor supply line into the radiator which is closed by a signal from a temperature sensing media attached to the radiator, wherein the temperature sensing media is sliding along the radiator height in order to control which portion of the radiator is employed for heat delivery.

In one alternative embodiment of the present invention, the temperature regulated valve on the vapor supply line comprises an induction coil around a plastic cylinder, a magnet, a spring, and a retractable mechanism in order to close the vapor supply line by the magnet by a signal from the temperature sensing media.

Multiple-Pass Condensing Vacuum Boilers

In some embodiments of the present invention, vacuum condensing boilers having multiple passes designs. Proposed in FIGS. 11 and 12 were designs of vacuum condensing boilers with single-pass flue gas flow. Like hot water condensing boilers, two- and three-flue gas passage designs can be foreseen for the purpose of compact design and efficiency. Instead of using a single-pass flow of flue gas from top to bottom as shown in FIG. 11, flue gas flows in multiple passes from top to bottom, and back to the top, as it exchanges heat with the condensate return. Such multiple pass embodiment can increase the efficiency of heat exchange and provide for a more compact design.

District Steam and Cogeneration Embodiments

According to one embodiment of the present invention, without changing the system piping and radiators arrangement, heat from the district grid may be utilized in place of the boiler. Accordingly, in one embodiment, a coil with district heating steam or hot water is used inside an evaporative heat exchanger in order to supply heat into the vapor vacuum heating system. Heating cycles of the vapor vacuum system are controlled by amount of steam/hot water supplied into an evaporative heat exchanger.

In another embodiment, exhaust from cogeneration Combined Heat and Power (CHP) system can be utilized in a heat exchanger/evaporator for the vapor vacuum systems proposed here. Any source of energy that can provide steam can be utilized in the present invention, including industrial waste heat, solar, geothermal, etc.

Naturally-Induced Vacuum Embodiments

Finally is presented an embodiment of the present invention with a naturally induced vacuum. According to another embodiment, in place or in addition to a vacuum pump, the boiler operations may be cycled in order to naturally induce and maintain a vacuum. For this purpose, an air vent/vacuum check valve set or a combined device is provisioned either on each radiator or on the system air vent line connected to each radiator. In the first heating cycle, the boiler is stopped when thermostat's set temperature is achieved and the most distant radiator is heated from top to bottom. The second condition is essential to verifying that the system is completely purged of air. In a cooled system, steam condenses inside and creates a vacuum, but the vacuum check valves will not let air in. Theoretically, system can create a vacuum as low as 27 to 28.5 inches Hg when cooled down to 90-120° F., correspondingly. Additionally, in some embodiments, a vacuum pump can also be utilized for cold start of leak tight system and for converted steam system with minor leaks.

To take advantage of a vacuum in the system, the second and subsequent heating cycles are performed with a negative boiler cut off pressure setting or setting lower than vacuum check valve cracking pressure. If required, the air purging cycle can be repeated at boiler cut off pressure setting higher than vacuum check valve cracking pressure. The system is operated by automatic boiler controller in order to optimize working pressure/vacuum sequence.

The previously described vacuum single-pipe system of FIG. 1 which has periodic condensate return can be readily converted into a vapor vacuum system with naturally-induced vacuum by adding check valve to each radiator air vent. The cycling boiler operations include the first heating cycle at a pressure higher than the check valves' cracking pressure; vacuum formation in the closed, cooled system; and the subsequent boiler operation set to vacuum or pressure below check valves cracking pressure. The radiator check valve can be installed either before or after the radiator vent valve on each radiator. If the vacuum check valve is installed before the radiator air vent valve, the air vent valve is not participating in the second and subsequent heating cycles; so longer trouble-free operation time is expected. The radiator vacuum check valves stay closed as long as the system operates under vacuum. Should any vacuum check valve fail, the corresponding air vent valve will still be on guard to stop the steam from exiting the radiator; air will be sucked in through the faulty vacuum check valve after every heating cycle and the system will start to function like a regular steam heating system.

In warm weather, complete system heating cycle, in order to purge the system of air and create a vacuum, is excessive. An auxiliary vacuum pump, connected to the system through control valve, can be provisioned to quickly restore vacuum in retrofitted system before heating cycle. Compared to known vacuum systems where high capacity vacuum pump is on and off during every heating cycle, vacuum pump of significantly less capacity, cost and maintenance operates only for approximately 10-15 minutes to restore vacuum in the system. Then the boiler is cycled at cut off pressure higher than check valves' cracking pressure until thermostat set temperature is achieved; air is completely purged from the system by that time. Vacuum emerges naturally afterwards in idle cooling system. A gas-fueled system with millivolt control, powered by pilot flame, is electricity independent and will maintain the vacuum without vacuum pump in case of power shortage.

By installing a check valve with 1 psi cracking pressure behind each air vent valve, a one-hundred-year-old residential single-pipe steam system which had six radiators was converted by the inventor into a vacuum system with naturally induced vacuum. In test runs, 24 inch Hg vacuum was produced in 80 minutes after the boiler stopped in the first heating cycle. Vacuums of 22, 19 and 17 inch Hg were retained after 330, 260, and 165, correspondingly. This timing matches boiler day time cycling frequency during a cold season, but system ability to hold vacuum overnight is not sufficient. Either vacuum pump should be employed to restore vacuum in the morning or system should be purged from air during first heating cycle at pressure higher then check valves cracking pressure.

Figure 14:
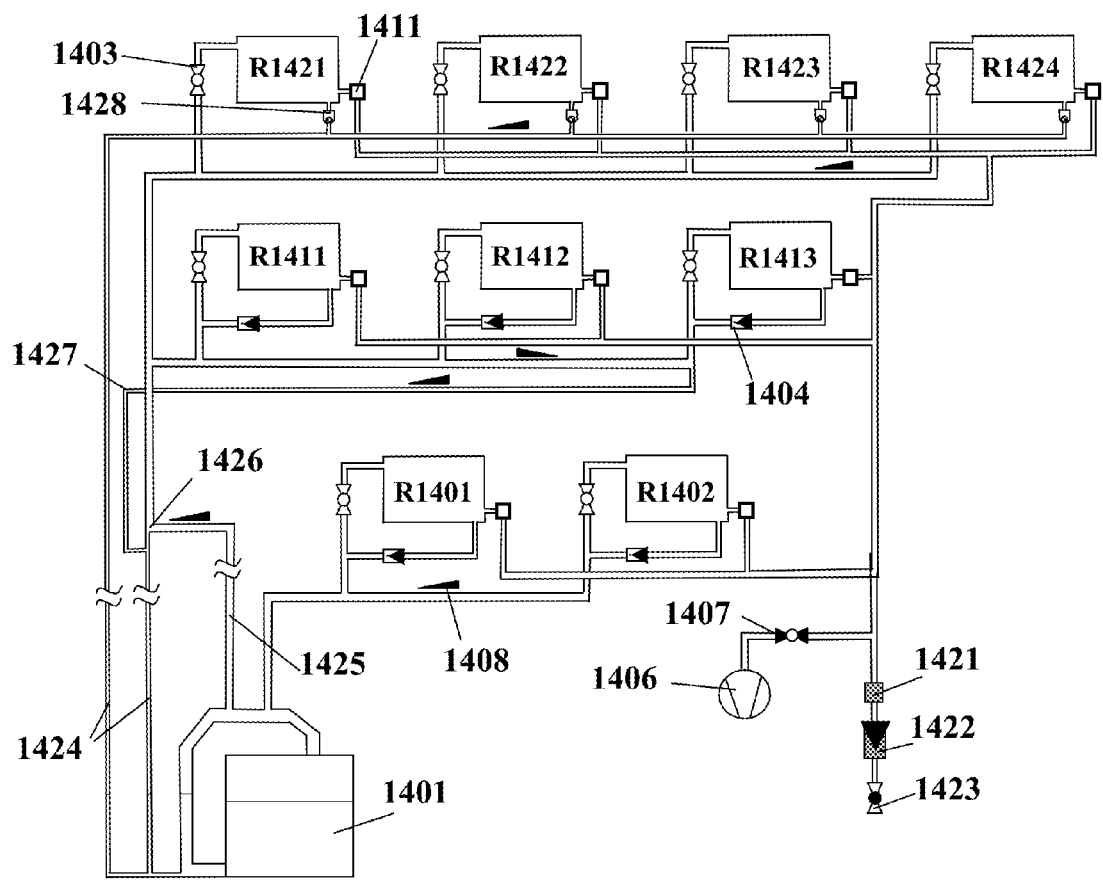
FIG. 14 illustrates a schematic of an embodiment of a large system with naturally induced vacuum according to yet another embodiment of the present invention.

An illustrative schematic for a large system with naturally induced vacuum according to one embodiment of the present invention is shown in FIG. 14. Such a system includes a boiler 1401, radiators R1421-R1424, R1411-R1413, and R1401-R1402 with a radiator control valve 1403, a radiator condensate flow control valve 1404 and a radiator air vent valve 1411 on each radiator. For the conversion of large existing steam systems into vapor vacuum systems with a naturally-induced vacuum, a single system vacuum check valve 1422, a system air vent valve 1421, and a system control valve 1423 may be utilized to improve reliability and leak detection. To protect the system from radiator vacuum check valve failure/leakage, lines from each radiator air vent 1411 are connected to the system's only vacuum check valve 1422. The on and off control valve 1423 is in sync with the boiler operation and can be used instead of or in addition to the system vacuum check valve 1422 and for routine system pressure leak tests. Similarly, the system's air check valve 1421 would secure system against radiators' air vent valve failure; faulty valves can easily be traced by monitoring the temperature of the lines. As previously discussed, vacuum was created initially and restored (if necessary) by vacuum pump 1406 connected through a vacuum pump control valve 1407. Line pitching 1408 is provisioned for proper condensate flows.

Due to heat loss in a long supply lines, too much steam may condense on conduit walls. Intermediate condensate drippings 1426 and 1427 into wet return 1424 are shown: from up feed riser 1425 and from a group of upper floor radiators (R1411, R1412, R1413), respectively. For radiators R1421-R1424, a separate condensate return through the line with a float check valve 1428 on each radiator is shown. Radiators R1401 and R1402 are closest to the boiler 1401 and have short supply lines.

Without changing the system piping and radiator arrangement, steam from the district grid may be utilized in place of the steam boiler in a vacuum system with a naturally induced vacuum. The vapor heating system with a naturally induced vacuum may be integrated into a district steam heating system in one of two ways:

(1) Single loop (direct steam usage): After pressure reduction, the district steam is throttled into a vapor heating system with a naturally-induced vacuum. The amount of steam is controlled in order to keep the heating system at the desired vacuum level. A water pump would be provisioned in such system in order to return excessive condensate into a district steam heating system (2) Separate loop (indirect steam usage): A coil with high-pressure district steam is used inside an evaporative heat exchanger to get the vapor heating system started with naturally-induced vacuum.

Depending on the particular system specifics, an automatic boiler controller would perform the following functions:

(1) Vacuum pump switch on/off to restore a vacuum in the idle cooled system.

(2) First boiler heating cycle at switch off pressure slightly higher than vacuum check valve cracking pressure.

(3) Temperature control of the most distant radiator as an indication of the complete air removal from the system.

(4) Monitoring the speed of the vacuum formation in a system.

(5) Second and subsequent heating cycles operate at the boiler cut-off pressure below vacuum check valves cracking pressure; the warmer the weather outside, the less cut-off pressure is utilized and the lower is the steam/vapor temperature.

(6) Low water shut off device to prevent boiler overheating.

(7) Air vent line temperature monitoring to detect radiators air vent failure.

The boiler controller may be integrated into the building control system in order to optimize operation. One high power boiler can be replaced by a set of smaller capacity boilers fired up alone or in a group to save energy, as well as to allow ease of maintenance and emergency repairs.

Control Logic for Boiler and Radiators

According to one illustrative embodiment of the present invention, a possible boiler control logic is shown in Table 2.

According to one embodiment of the present invention, vacuum heating system control includes several conditional loops to switch the boiler ON and OFF. The boiler is ON if all of the following conditions are met:

House temperature is below set temperature by predetermined offset temperature;

Vapor temperature at the boiler exit is below a set temperature; and

Water level in the boiler is higher than a low water cut off setting.

The house temperature controller follows day/time/temperature settings to keep temperature within house comfortable during day time and lower at night to save energy. The vapor temperature at the boiler exit is adjusted depending on the outside temperature, the colder the outside temperature the higher the vapor temperature at the boiler exit. The boiler is switched ON and OFF to maintain the vapor set temperature during the heating cycle. Water cut off setting is set by the boiler manufacturer.

Only when the boiler is OFF and cooled below 100° F.—usually in the night or early in the morning—the vacuum level is checked routinely and restored if required. The vacuum pump is turned ON if all of the following conditions are met:

Boiler is OFF;

Boiler temperature is below 100° F.; and

Vacuum in the system is below a pressure switch setting, preferably in the range of 25-28 inch Hg, and even more preferably at the highest possible pressure setting.

The vacuum pump restores vacuum level in the system up to the pressure switch setting, and is switched OFF and disconnected after this level is reached. Depending on the system's leak tightness, pump may be turned on a daily, weekly, or monthly basis.

In one embodiment of the present invention, the vacuum level in the system is constantly monitored based on pressure in the system and vapor temperature at the boiler exit. In air tight system, these parameters follow the saturated steam temperature table within 1° F. difference. Air presence in the system reduces the temperature of the saturated vapor, the more air, the bigger the deviation. Based on Dalton's law of Partial Pressures, in temperature interval of 140-212° F. a deviation of 12-18° F. corresponds roughly to 30% air presence in the system and can be used for alarm notice and mandatory system stop for leak search and to restore vacuum in the system. This logic can be incorporated into the boiler controller to constantly monitor the deviation between vapor temperature at the boiler exit from the steam table value of saturated steam at current pressure. When compared to the values recorded at the boiler fresh start, this data provides valuable information about changes in the system tightness.

The house controller is usually installed in the farthest room which is the last room to receive heat. Additionally, radiators in other rooms can be furnished with individual room controllers.

For vacuum heating systems working with regular boiler, a control valve on radiator supply line is switched ON and OFF by the room controller depending on temperature in the room and a float ball check valve on each radiator is used to prevent vapor entering into condensate return line.

For vacuum heating systems working with a condensing boiler, control of heat supply into radiators per room base requires one of the following:
- Control valve on radiator supply (feeder) line connected to room controller and HAV on condensate return line;
- Radiator build-in HAV on condensate exit line; or
- Control valve on radiator supply (feeder) line connected to a sensing element which is set to around 100° F. and slides along radiator height.

TABLE 2

Illustrative Control Logic

System settings:

Boiler is switched ON when difference between temperature in a most distant room ($T_{room}$) and a set temperature ($T_{set}$) is more than 3° F.
Vapor from boiler upper temperature (193° F.), lower temperature (179° F.) are chosen depending on outside temperature (14° F. temperature offset)
Initial system vacuum of 28 inch Hg
Operational procedure:

While difference between temperature in a most distant room $T_{room}$ and $T_{set}$ is more than 3° F., room controller switch boiler ON
Boiler start oscillating
    IF vapor temperature on boiler exit > 193° F., boiler OFF
    IF vapor temperature on boiler exit < 179° F., boiler ON
When temperature in a most distant room $T_{room}$ is equal to $T_{set}$, room controller switch boiler OFF
    IF vapor temperature on boiler exit is less than 100° F.
        IF vacuum level less than 20"Hg, alarm "Time to check system for leaks"
        IF vacuum level less than 28"Hg, vacuum switch ON to start vacuum pump (solenoid valve OPEN and vacuum pump ON)
        IF vacuum level is 28"Hg, vacuum switch OFF to stop vacuum pump (solenoid valve CLOSE and vacuum pump OFF) - Vacuum restored, system waiting for thermostat calls Industrial Applications and Advantages of the Present Invention Compared to a hot water heating system with a condensing boiler, the proposed system:
(1) Has higher energy value heat which is delivered into the radiators by vapor.
(2) Employs no hot water circulators, bypass valves, expansion tank, etc.
(3) Has less condensing coil length.
(4) Has less water in the boiler.
(5) Will not require expensive building repairs if leakage occurs.
(6) Has less electricity dependency.
(7) Has no frozen pipe problems and expensive repairs caused by power shortage.
(8) Requires no mechanical floor every 15-20 floors for high rise building to pump hot water.

Regular non-condensing boilers can be integrated into a two-pipe vapor vacuum heating system as well. The condensing section exclusion from the boiler would cause a decrease in the energy efficiency of the system, but would benefit the boiler maintenance, life expectancy, and cost.

CONCLUSION

Prior Art Teaches Away

While vapor (steam) heating is well known, it has long been known and believed that vapor heating systems deliver hot condensate above 100° F. Since conventional condensing boilers require condensate return temperatures below 100° F., the prior art has taught away from utilizing condensate from vapor heating systems with condensing boilers. The inventor has recognized the aforementioned problem in the prior art, and has developed several methods and systems to lower the condensate return temperature as described above. When used alone or in combination, the various methods allow vacuum heating systems to be integrated with condensing boilers for the first time.

Furthermore, unlike conventional steam and vacuum vapor systems, no steam traps are required in the present invention. The prior art teaches away from the present invention by requiring steam traps.

The prior art has also never disclosed vapor vacuum condensing boilers, and taught away from their use.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A heating system integrating a closed-loop two-pipe vapor vacuum distribution sub-system having periodic condensate return and a vacuum condensing boiler, the heating system comprising:
a vapor source adapted to generate vapor, the vapor source comprising a boiler, said boiler comprising an evaporating section and a condensing section;

one or more radiators comprising a heat activated valve at an exit from each radiator, the heat activated valve set to close at approximately 100° F. to prevent hot condensate from entering the condensing section;

a feeder conduit connecting said vapor source to said radiators;

a return conduit for returning condensate from each radiator back to said vapor source, wherein said return conduit contains no steam traps;

a vacuum pump to evacuate air from the system to a vacuum level, wherein the vapor source, the feeder conduit, and the return conduit are air-tight;

a temperature sensor adapted to sense a temperature of the vapor leaving the vapor source;

a pressure sensor adapted to sense a pressure of the vapor; and a control unit for controlling the vapor source and the vacuum pump based on the temperature and the pressure sensed by the temperature sensor and the pressure sensor to maintain a predetermined vacuum level and a predetermined temperature of the vapor, wherein the return conduit returns said condensate from the radiators to the condensing section at a temperature below approximately 100° F. sufficient for condensing water from flue gas from a burner in the vapor source.

2. The system of claim 1, wherein air is evacuated by the vacuum pump when the vapor source is idle at a vapor source temperature below approximately 100° F. when the vacuum level measured by the pressure sensor is below a predetermined threshold.

3. The heating system of claim 1, further comprising:
a thermostat in a space to be heated,
wherein the vapor source is switched on and off by the control unit until a temperature in the space to be heated is equal to a thermostat set temperature.

4. The system of claim 1, further comprising:
a backflow valve on a condensate return line at an entrance into the condensing section to prevent water backflow into the condensate return line.

5. The system of claim 1, wherein the vacuum level in an idle system at a temperature in the vacuum condensing boiler below approximately 100° F. is up to 29 inches Hg.

6. The heating system of claim 1, wherein the vacuum level and a corresponding temperature of the vapor source are adjusted based on an outside temperature, and wherein a lower outside temperature results in a higher operating pressure and corresponding higher temperature of the vapor source.

7. The heating system of claim 1, wherein at least one radiator comprises a build-in heat activated valve adapted to close a radiator entrance when a condensate return temperature exceeds approximately 100° F.

8. The heating system of claim 7, wherein the build-in heat activated valve comprises a capsule positioned at the radiator bottom and filled with a low boiling fluid, and wherein said capsule is connected by a capillary to a bellow which expands and closes the radiator entrance when the capsule is heated above a set temperature.

9. The heating system of claim 1, further comprising:
a set of valves adapted to split the system into a heated part, connected to the evaporating section, and a cooling part, connected to the condensing section,
wherein a movement of the set of valves reconnects the cooling part to the evaporating section and the heated part to the condensing section, reversing system operation, without stopping the vapor source operation.

10. The heating system of claim 1, wherein the feeder conduit from the vapor source to the radiators and the return conduit are made from thermoplastic tubing.

11. The heating system of claim 1, wherein the vapor source further comprises:
a combustion chamber at the burner end for burning fuel with air and generating hot flue gas;
a counter-current heat exchanger around the combustion chamber in the evaporating section for exchanging heat between the flue gas and evaporating water; and
a second heat exchanger in the condensing section for exchanging heat between the flue gas and incoming low-temperature condensate return having a temperature below approximately 100° F., generating flue gas condensate.

12. The heating system of claim 1, wherein the control unit further comprises program code, which when executed causes the system to perform a process wherein the vacuum level is checked routinely and restored if necessary, the process comprising:
turning on the vacuum pump when the vapor source is off, a vapor source temperature is below 100° F., and the vacuum level in the system is below a pressure switch setting.

13. The heating system of claim 1, wherein the control unit further comprises program code, which when executed causes the system to perform a process wherein leak tightness of the system is checked, the process comprising:
monitoring the vacuum level in the system based on the pressure in the pressure sensor and the temperature in the temperature sensor; and
activating an alarm when the temperature of the vapor at the pressure sensed by the pressure sensor deviates by more than 10° F. from a steam table value of a saturated steam temperature at the sensed pressure.

14. A heating system having a closed-loop two-pipe vapor vacuum distribution sub-system having periodic condensate return, the heating system comprising:
a vapor source adapted to generate vapor, the vapor source comprising a boiler, said boiler comprising an evaporating section and a condensing section;
one or more radiators, each radiator comprising a float check valve on a radiator condensate return line adapted to periodically return condensate from the radiator at a temperature below approximately 100° F., wherein at least one radiator entrance comprises a control valve adapted to control vapor flow into the radiator based on a temperature in the radiator's location;
a feeder conduit connecting said vapor source to said radiators;
a return conduit for returning condensate from each radiator back to said vapor source, wherein said return conduit contains no steam traps;
a vacuum pump to evacuate air from the system, wherein the vapor source, the feeder conduit, and the return conduit are air-tight;
a temperature sensor adapted to sense a temperature of the vapor leaving the vapor source;
a pressure sensor adapted to sense a pressure of the vapor; and
a control unit for controlling the vapor source and the vacuum pump based on the temperature and the pressure sensed by the temperature sensor and the pressure sensor to maintain a predetermined vacuum level and a predetermined temperature of the vapor.

15. The system of claim 14, wherein air is evacuated by the vacuum pump when the vapor source is idle when the pressure sensed in the pressure sensor is above a predetermined threshold.

16. The system of claim 14, further comprising:
a backflow valve on a condensate return line of the vapor source to prevent water backflow into the condensate return line.

17. The system of claim 14, wherein the vacuum level in an idle system at a temperature in the vapor source below approximately 100° F. is up to 29 inches Hg.

18. The heating system of claim 14, wherein the vacuum level and a corresponding temperature of the vapor source are adjusted based on an outside temperature, and wherein a lower outside temperature results in a higher operating pressure and corresponding higher temperature of the vapor source.

19. A heating system having a closed-loop two-pipe vapor vacuum distribution sub-system, the heating system comprising:
a boiler adapted to generate vapor, the boiler comprising a burner, an evaporating section and a condensing section;
one or more radiators;
a feeder conduit connecting said evaporating section of said boiler to said radiators;
a return conduit for returning condensate from each radiator back to said condensing section of said boiler at a return condensate temperature below approximately 100° F. sufficient for condensing water from flue gas from the burner in the boiler; and
a vacuum pump to evacuate air when the boiler is idle to a vacuum level of at least 20 inches Hg at a vapor temperature below approximately 100° F., wherein the boiler, the feeder conduit, and the return conduit are air-tight.

20. The system of claim 19, further comprising:
a backflow valve on a condensate return line of the boiler to prevent vapor from entering the condensate return line.

21. The system of claim 19, further comprising:
a thermostat in a space to be heated,
wherein the boiler is switched on and off by a control unit until a temperature in the space to be heated is equal to a thermostat set temperature.

22. The system of claim 19, wherein the vacuum level in an idle system at a temperature in the boiler below approximately 100° F. is up to 29 inches Hg.

23. The system of claim 19, wherein the vacuum level and a corresponding temperature of the boiler are adjusted based on an outside temperature, and wherein a lower outside temperature results in a higher operating pressure and corresponding higher temperature of the boiler.

24. The system of claim 19, wherein at least one radiator comprises a build-in heat activated valve adapted to close a radiator entrance when a condensate return temperature exceeds approximately 100° F.

25. The system of claim 24, wherein the build-in heat activated valve comprises a capsule positioned at the radiator bottom and filled with a low boiling fluid, and wherein said capsule is connected by a capillary to a bellow which expands and closes the radiator entrance when the capsule is heated above a set temperature.

26. The system of claim 19, further comprising:
a set of valves adapted to split the system into a heated part, connected to the evaporating section, and a cooling part, connected to the condensing section,
wherein a movement of the set of valves reconnects the cooling part to the evaporating section and the heated part to the condensing section, reversing system operation, without stopping the boiler operation.

27. The system of claim 19, wherein the feeder conduit from the boiler to the radiators and the return conduit are made from thermoplastic tubing.

28. The system of claim 19, wherein the boiler further comprises:
a combustion chamber at the burner end for burning fuel with air and generating hot flue gas;
a counter-current heat exchanger around the combustion chamber in the evaporating section for exchanging heat between the flue gas and evaporating water; and
a second heat exchanger in the condensing section for exchanging heat between the flue gas and the incoming low-temperature condensate return having a temperature below approximately 100° F., generating flue gas condensate.

29. The system of claim 19, further comprising:
a temperature sensor adapted to sense a temperature of the vapor leaving the boiler;
a pressure sensor adapted to sense a pressure of the vapor; and
a control unit for controlling the boiler and the vacuum pump based on the temperature and the pressure sensed by the temperature sensor and the pressure sensor to maintain a predetermined vacuum level and a predetermined temperature of the vapor.

30. The system of claim 29, wherein the control unit further comprises program code, which when executed causes the system to perform a process wherein the vacuum level is checked routinely and restored if necessary, the process comprising:
turning on the vacuum pump when the boiler is off, a boiler temperature is below 100° F., and the vacuum level in the system is below a pressure switch setting.

31. The system of claim 29, wherein the control unit further comprises program code, which when executed causes the system to perform a process wherein leak tightness of the system is checked, the process comprising:
monitoring the vacuum level in the system based on the pressure in the pressure sensor and the temperature in the temperature sensor; and
activating an alarm when the temperature of the vapor at the pressure sensed by the pressure sensor deviates by more than 10° F. from a steam table value of a saturated steam temperature at the sensed pressure.

* * * * *